(12) United States Patent
Srivastava et al.

(10) Patent No.: US 12,213,095 B2
(45) Date of Patent: Jan. 28, 2025

(54) SLICE RESOURCE MANAGEMENT FOR REDUCING THE NEGATIVE IMPACTS OF SLICE QUOTAS

(71) Applicant: Cisco Technology, Inc., San Jose, CA (US)

(72) Inventors: Vimal Srivastava, Bangalore (IN); Ravi Shekhar, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 181 days.

(21) Appl. No.: 17/528,952

(22) Filed: Nov. 17, 2021

(65) Prior Publication Data

US 2023/0156649 A1    May 18, 2023

(51) Int. Cl.
  *H04W 72/04* (2023.01)
  *H04W 60/00* (2009.01)
  *H04W 76/10* (2018.01)

(52) U.S. Cl.
  CPC .......... *H04W 60/00* (2013.01); *H04W 72/04* (2013.01); *H04W 76/10* (2018.02)

(58) Field of Classification Search
  CPC ..... H04W 60/00; H04W 60/02; H04W 60/04; H04W 60/06; H04W 72/04; H04W 72/06; H04W 72/08; H04W 72/10; H04W 76/10
  See application file for complete search history.

(56) References Cited

U.S. PATENT DOCUMENTS

2018/0227873 A1  8/2018  Vrzic et al.
2018/0302877 A1  10/2018  Bosch et al.
(Continued)

FOREIGN PATENT DOCUMENTS

EP    3800916 A1    4/2021
WO   2020186145 A1   9/2020
(Continued)

OTHER PUBLICATIONS

3GPP, "3rd Generation Partnership Project; Technical Specification Group Services and System Aspects; Study on enhancement of network slicing; Phase 2 (Release 17)," 3GPP TR 23.700-40 V17.0.0, Mar. 2021, 224 pages.

3GPP, "3rd Generation Partnership Project; Technical Specification Group Services and System Aspects; System architecture for the 5G System (5GS); Stage 2 (Release 17)," 3GPP TS 23.501 V17.2.0, Sep. 2021, 542 pages.

(Continued)

*Primary Examiner* — Khawar Iqbal
(74) *Attorney, Agent, or Firm* — Edell, Shapiro & Finnan, LLC

(57) ABSTRACT

A mobile network is operative to perform a quota validation procedure in relation to a maximum number of user equipments (UEs) permitted in a network slice. In one illustrative example, a control plane (CP) function of the mobile network may receive, from the UE, a message which indicates a registration request for registration and includes a slice ID of the network slice. The CP function may manage a registration procedure for assigning resources of the network slice to the UE. The CP function may alternatively manage the registration procedure to refrain from assigning the resources of the network slice to the UE, at least for a delay time period, based on identifying that an indication of the UE indicates an expected delay in use of service in the network slice. The indication may be included in the message and indicate the delay time period of the expected delay.

14 Claims, 20 Drawing Sheets

(56) References Cited

U.S. PATENT DOCUMENTS

| | | | |
|---|---|---|---|
| 2019/0254083 A1 | 8/2019 | Stammers et al. | |
| 2020/0404718 A1 | 12/2020 | Shekhar et al. | |
| 2021/0136674 A1 | 5/2021 | Lee et al. | |
| 2021/0153157 A1* | 5/2021 | Jeong | H04W 8/02 |
| 2021/0211974 A1 | 7/2021 | Prabhakar et al. | |
| 2021/0212010 A1 | 7/2021 | Lee et al. | |
| 2021/0297977 A1* | 9/2021 | Prabhakar | H04W 8/06 |
| 2021/0321325 A1 | 10/2021 | Srivastava et al. | |
| 2021/0368395 A1 | 11/2021 | Prabhakar et al. | |
| 2021/0368421 A1 | 11/2021 | Venkataraman et al. | |
| 2022/0007184 A1* | 1/2022 | Ferdi | H04L 63/0892 |
| 2022/0104115 A1 | 3/2022 | Jeong et al. | |
| 2022/0295380 A1* | 9/2022 | Cakulev | H04W 28/0925 |
| 2022/0369204 A1* | 11/2022 | Jeong | H04W 28/10 |
| 2023/0051733 A1* | 2/2023 | Shah | H04W 72/56 |
| 2023/0109272 A1* | 4/2023 | Ryu | H04L 63/0892 |
| | | | 370/329 |
| 2023/0120144 A1* | 4/2023 | Kim | H04W 48/18 |
| | | | 370/329 |
| 2023/0156583 A1* | 5/2023 | Murray | H04W 48/20 |
| | | | 370/329 |
| 2023/0164668 A1* | 5/2023 | Kim | H04W 48/06 |
| | | | 370/329 |
| 2023/0171598 A1* | 6/2023 | Normann | H04W 8/18 |
| | | | 455/410 |
| 2023/0180169 A1* | 6/2023 | Venkataraman | H04W 60/005 |
| | | | 455/435.1 |
| 2023/0189187 A1* | 6/2023 | Velev | H04W 48/16 |
| | | | 455/435.1 |
| 2023/0189189 A1* | 6/2023 | Venkataraman | H04W 60/005 |
| | | | 455/435.3 |
| 2023/0353457 A1* | 11/2023 | Hou | H04L 41/14 |
| 2024/0187353 A1* | 6/2024 | Chong | H04L 41/0894 |

FOREIGN PATENT DOCUMENTS

| | | |
|---|---|---|
| WO | 2021063764 A1 | 4/2021 |
| WO | 2021070028 A1 | 4/2021 |
| WO | 2021119627 A1 | 6/2021 |
| WO | 2021136599 A1 | 7/2021 |

OTHER PUBLICATIONS

3GPP, "3rd Generation Partnership Project; Technical Specification Group Core Network and Terminals; Non-Access- Stratum (NAS) protocol for 5G System (5GS); Stage 3; (Release 17)," 3GPP TS 24.501 V17.4.1, Sep. 2021, 863 pages.

"5.3 Registration and Connection Management," iTecTec, https://itectec.com/spec/5-3-registration-and-connection-management/, retrieved Oct. 20, 2021, 17 pages.

EventHelix, "5G Standalone Access Registration," Medium, https://medium.com/5g-nr/5g-standalone-access-registration-fe80aa28d723, Nov. 17, 2018, 15 pages.

Dr. Williams Stallings, "Chapter 9: Core Network Functionality, Qos, and Network Slicing," 5G Wireless, Addison- Wesley, 2021, 55 pages.

3GPP, "5G; System Architecture for the 5G System (3GPP TS 23.501 version 15.3.0 Release 15)," Technical Specification, ETSI TS 123 501, V15.3.0, Sep. 2018, 227 pages.

GSMA, "Generic Network Slice Template," Official Document NG.116, Version 5.0, Jun. 2021, 68 pages.

3GPP, "3rd Generation Partnership Project; Technical Specification Group Services and System Aspects; Procedures for the 5G System (5GS); Stage 2 (Release 17)," Technical Specification, 3GPP TS 23.502 V17.4.0, Mar. 2022, 738 pages.

3GPP, "3rd Generation Partnership Project; Technical Specification Group Services and System Aspects; Procedures for the 5G System (5GS); Stage 2 (Release 16)," Technical Specification, 3GPP TS 23.502 V16.12.0, Mar. 2022, 615 pages.

3GPP, 3rd Generation Partnership Project; Technical Specification Group Services and System Aspects; System architecture for the 5G System (5GS); Stage 2 (Release 17), Technical Specification, 3GPP TS 23.501 V17.4.0, Mar. 2022, 567 pages.

3GPP, "3rd Generation Partnership Project; Technical Specification Group Services and System architecture for the 5G System (5GS); Stage 2 (Release 16)," Technical Specification, 3GPP TS 23.201 V16.12.0, Mar. 2022, 454 pages.

3GPP, "3rd Generation Partnership Project, Technical Specification Group Core Network and Terminals, 5G System, Network Slice Admission Control Services Stage 3 (Release 17)," 3GPP TS 29.536 V0.4.0, Oct. 2021, pp. 1-59.

* cited by examiner

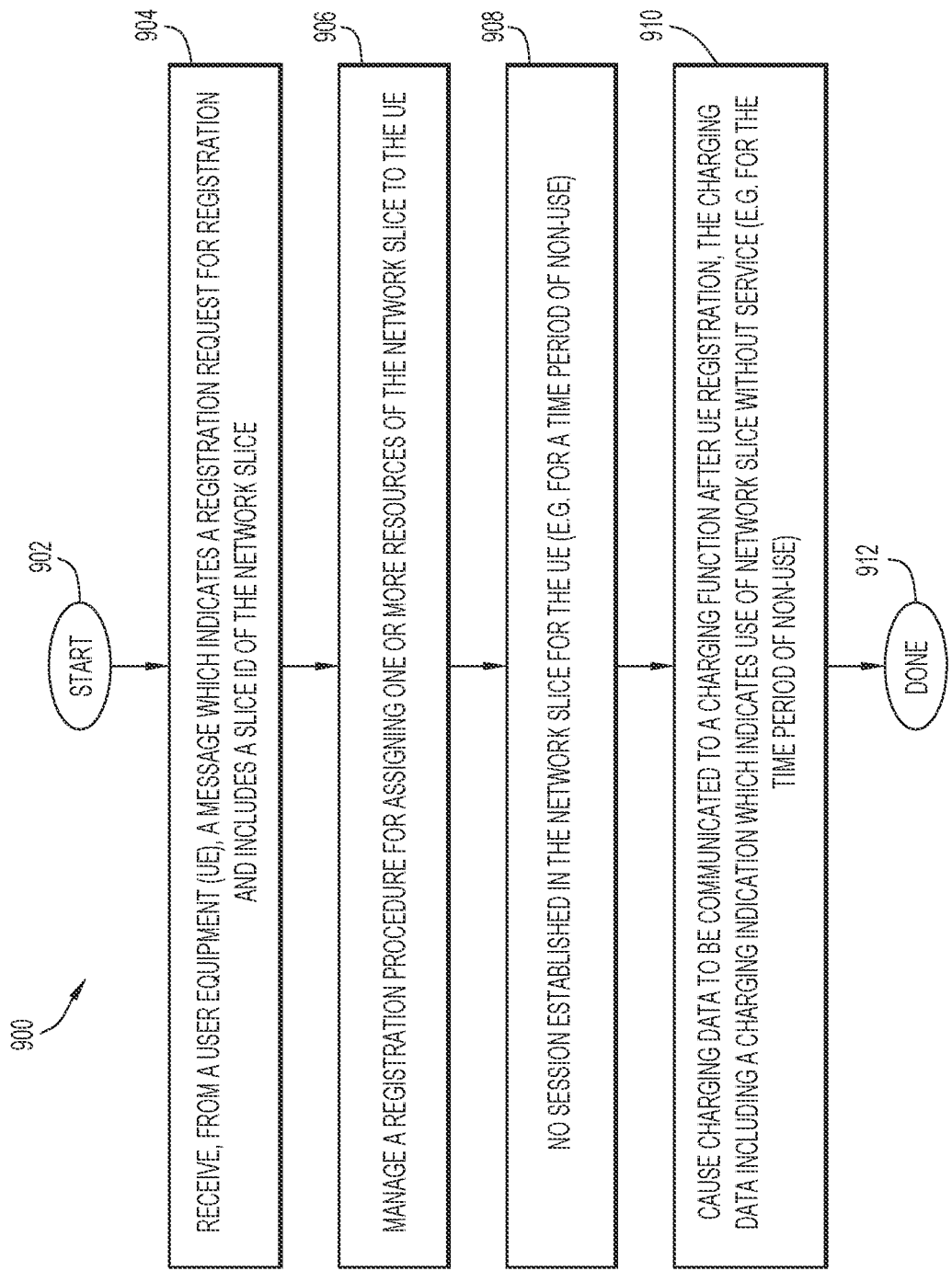

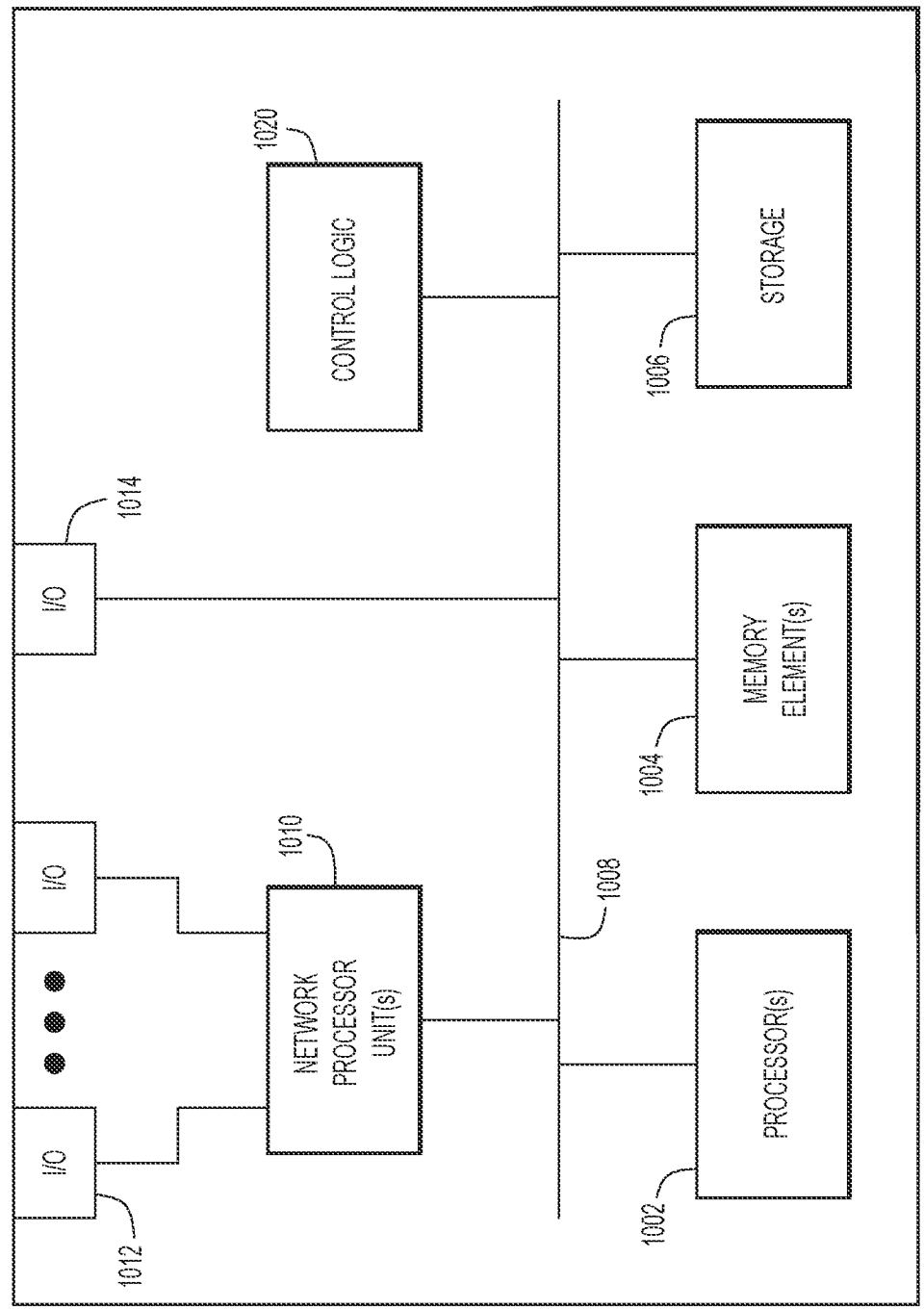

SLICE RESOURCE MANAGEMENT FOR REDUCING THE NEGATIVE IMPACTS OF SLICE QUOTAS

TECHNICAL FIELD

The present disclosure relates generally to telecommunications systems, and more particularly to techniques and mechanisms for improved slice resource management for reducing the negative impacts of slice quotas in mobile networks.

BACKGROUND

Fifth Generation (5G) network operation is defined in Third Generation Partnership Project (3GPP) standards. In a 5G network, network slicing is employed to allow operators to logically divide the network into multiple distinct slices, each of which has specific network characteristics and capabilities.

Each network slice in the 5G network may be identified by an identifier called a Single Network Slice Selection Assistance information (S-NSSAI). The S-NSSAI or "Slice ID" includes a slice/service type (SST) indicator of the slice/service type and a slide differentiator (SD) indicator which helps in differentiating slices of the same slice type. Different SSTs or slice/service types include enhanced Mobile Broadband (eMBB), Internet of Things (IoT), Vehicle-to-everything (V2X), and Ultra-Reliable Low-Latency Communication (URLLC).

Enhanced Network Slicing (eNS) is described in 3GPP Release 17 Study Items, 3GPP Technical Report (TR) 23.700-40. One of the key issues in these study items is the "Support of network slice related quota on the maximum number of UEs." Here, the multiple proposed solutions include the validation of a "Quota Validation" during registration of a user equipment (UE). To illustrate by example, when a UE sends a registration request to the network, it requests for a particular S-NSSAI that it needs for obtaining network service. On receiving the registration request, an Access and Mobility Management Function (AMF) validates if the quota limit for the requested S-NSSAI has been reached, by querying a network function (NF). The NF may be a Policy Control Function (PCF), a Unified Data Management (UDM) entity, an NF Slice Selection Function (NSSF), or another NF of the 5G network. If the quota limit has been reached, the network will reject the requested S-NSSAI registration.

Many concerns in the proposed solutions have been identified, and these concerns should be addressed before one or more final solutions for eNS are selected.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3B-2 is a second part of the call flow diagram of FIG. 3B-1 for describing improved slice resource management for use with slice quota validation according to some implementations of the present disclosure, where the call flow illustrates further the second scenario in which a delay time period is expired for the assignment of resources in the network slice for the UE;

FIG. 3B-3 is an alternative second part of the call flow diagram of FIG. 3B-1 for describing improved slice resource management for use with slice quota validation according to some implementations of the present disclosure, where the call flow illustrates further a third scenario in which a different UE may operate to, within the delay time period, register in the network slice and subsequently establish a session for service via the network slice;

FIGS. 7B-1 and 7B-2 form a second part of the call flow diagram of FIG. 7A for describing the call flow for improved slice resource management for use with slice quota validation according to some implementations, where the network operates to prioritize network slice registration of a UE associated with a first level of service, priority, or subscription over the different UE which is associated with a second level of service, priority, or subscription per FIG. 7A;

FIG. 9 is a flowchart for describing a method for improved slice resource management for use with slice quota validation according to some implementations, where charging data may be communicated with a charging indication which indicates use of a network slice without service (e.g. for a time period of non-use) for differential charging; and FIG. 10 illustrates a hardware block diagram of a computing device that may perform functions associated with operations of a control plane function (e.g. a control plane function for mobility management) according to some implementations of the present disclosure.

DESCRIPTION OF EXAMPLE EMBODIMENTS

Figure 1A:
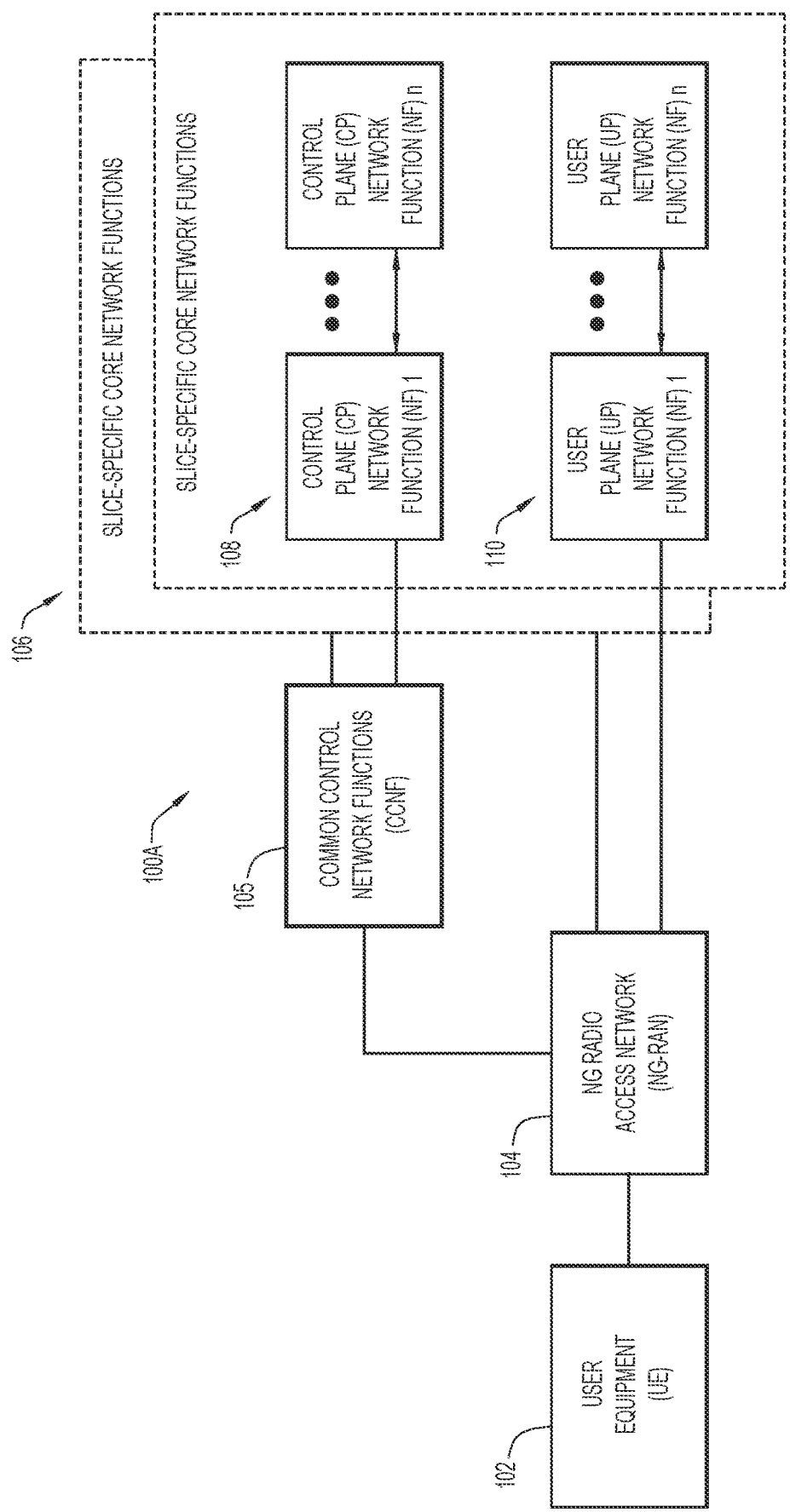
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for improved slice resource management for reducing the negative impacts of slice quotas in mobile networks are described herein.

In one illustrative example, a mobile network may be operative to perform a quota validation procedure in relation to a maximum number of user equipments (UEs) permitted in a network slice. A control plane (CP) function of the mobile network may receive, from the UE, a message which indicates a registration request for registration and includes a slice ID of the network slice. The CP function may manage a registration procedure for assigning resources of the network slice to the UE. The CP function may alternatively manage the registration procedure to refrain from assigning the resources of the network slice to the UE, at least for a delay time period, based on identifying that an indication of the UE indicates an expected delay in use of service in the network slice. In some implementations, the indication may be included in the message and indicate the delay time period of the expected delay.

More detailed and alternative techniques and implementations are provided herein as described below.

EXAMPLE EMBODIMENTS

FIG. 1A is an illustrative representation of a general network architecture 100A of a Fifth Generation (5G) network. Network architecture 100A includes common control network functions (CCNF) 105 and a plurality of slice-specific core network functions 106. In general, the 5G network is configured to facilitate communications for mobile devices, such as a user equipment (UE) 102. UE 102 may be any suitable type of device, such as a cellular telephone, a smart phone, a tablet device, an Internet of Things (IoT) device, a Machine-to-Machine (M2M) device, and a sensor, to name but a few. UE 102 may obtain access to the 5G Core (5GC) of the 5G network via a radio access network (RAN), which may be or include a Next Generation (NG) RAN (NG-RAN) 104. NG-RAN 104 may include one or more base stations or gNodeBs (gNBs), such as a gNB 107.

Network architecture 100A of the 5G network may be a Service-Based Architecture (SBA) which provides a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105.

Slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
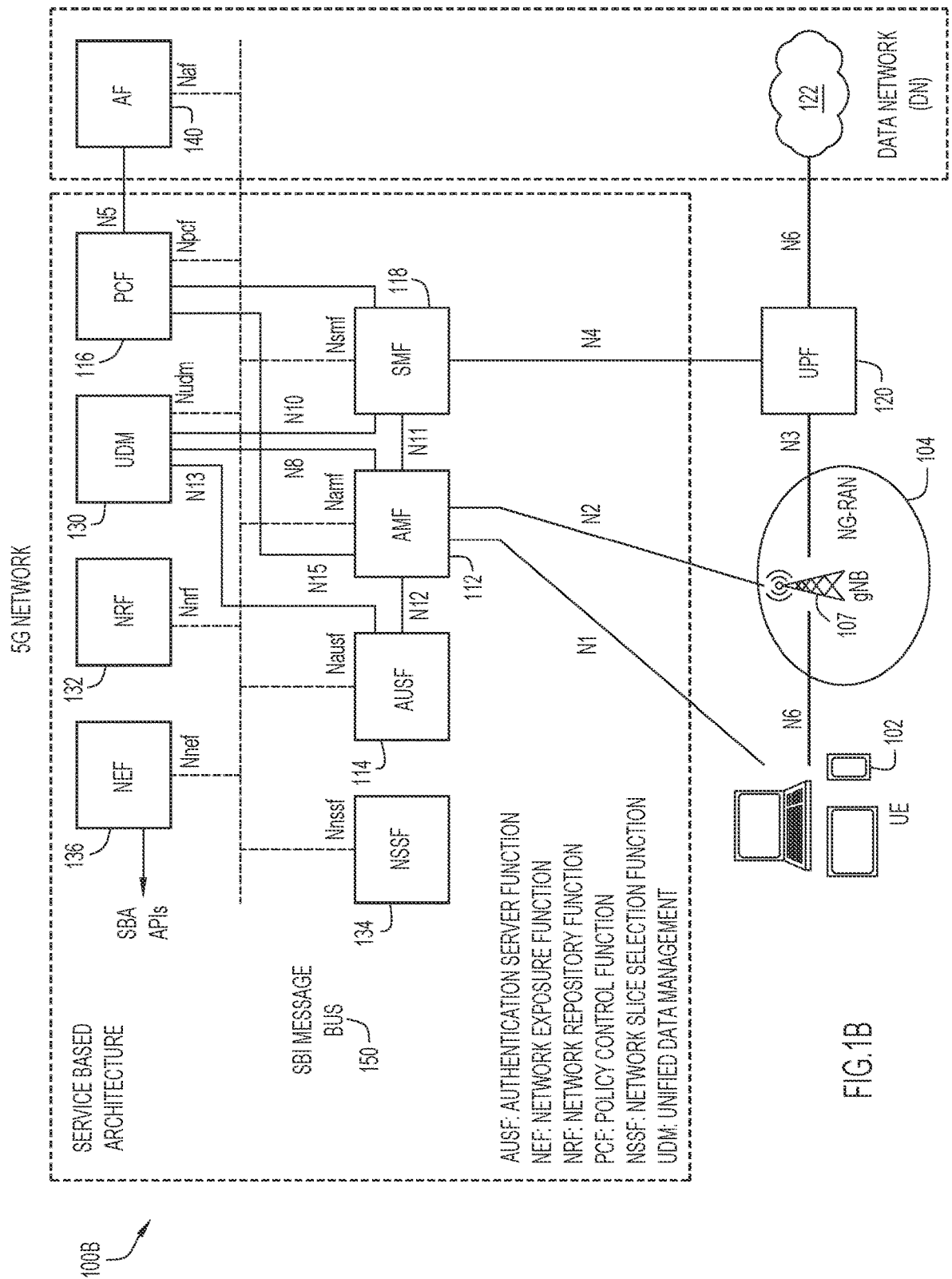
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. In Third Generation Partnership Project (3GPP) standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. DN 122 may be associated with a Data Network Name (DNN). Other NFs in the 5G network include an NSSF 134, a network exposure function (NEF) 136, an NF repository function (NRF) 132, and a Unified Data Management (UDM) function 130.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. A plurality of interfaces and/or reference points N1-N8, N10-N13, and N15 shown in FIG. 1B (as well as others) may define the communications and/or protocols between each of the entities, as described in the relevant (evolving) standards documents.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

The SBA of the 5G network is better illustrated in FIG. 1B, whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using Hypertext Transfer Protocol Version 2 or "HTTP/2"). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

An NF instance is an identifiable instance of an NF. In general, NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

The SBA may be an enhanced eSBA architecture, introduced in Release 16 of the 3GPP standards, defining what are referred to as NF Sets and NF Service Sets. An NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit of which an NF service is composed. An NF Service Set is a group of interchangeable NF service instances of the same service type within an NF instance. The NF service instances in the same NF Service Set have access to the same context data.

In a 5G network, network slicing is employed to allow operators to logically divide the network into multiple distinct slices, each of which has specific network characteristics and capabilities. Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and Service Level Agreements (SLAs), and may include the virtualized resources required to service the needs of a Mobile Virtual Network Operator (MVNO) or group of subscribers, including UPF 120, SMF 118, and PCF 116.

Each network slice in the 5G network may be identified by an identifier referred to as a Single Network Slice Selection Assistance information (S-NSSAI). The S-NSSAI includes a slice/service type (SST) indicator of the slice/service type and a slide differentiator (SD) indicator which helps in differentiating network slices of the same slice type. Different SSTs or slice/service types may include enhanced Mobile Broadband (eMBB), Massive Internet of Things (MIOT), Vehicle-to-everything (V2X), massive Machine-Type Communication (mMTC), and Ultra-Reliable Low-Latency Communication (URLLC).

When UE 102 registers to the 5GC, it sends to AMF 112 a registration request which includes a Requested NSSAI and receives an Allowed NSSAI from the 5GC in response. The Allowed NSSAI may be selected based on the subscription of UE 102 and other criteria. The other criteria may include, for example, include location, network conditions, access-types, operator policies, etc. On receiving an Allowed NSSAI from the 5GC, UE 102 may establish a Protocol Data Unit (PDU) session to access the intended service.

Enhanced Network Slicing (eNS) is described in 3GPP Release 17 Study Items, 3GPP Technical Report (TR) 23.700-40. One of the key issues in these study items is the "Support of network slice related quota on the maximum number of UEs." There are multiple proposed solutions which involve the validation of a "Quota Validation" during registration. In one example, when a UE sends a registration request to the network, it requests for a particular S-NSSAI (i.e. a Slice ID) that it needs for obtaining network service. On receiving the registration request, the AMF causes a validation procedure to be performed to validate whether the quota limit for the requested S-NSSAI has been reached. The validation may be performed by the AMF querying an NF, such as the PCF, the UDM, the NSSF, or another NF in the 5G network. If the quota limit has already been reached, network rejects the requested S-NSSAI registration.

Many concerns in the proposed solutions have been identified, and these concerns should be addressed before one or more final solutions for eNS are selected. For one, there is no specified method for network nodes to monitor the registered UEs to identify whether they are consuming slice resources after their access to the network slice. If the quota limit is reached for a given S-NSSAI, any and all of the newly-registering UEs that register for the S-NSSAI will be rejected. This is true even if the already-registered UEs are not using the slice for any service (e.g. even for a very long time). This would also result in potential loss of revenue to the service provider.

In addition, there is no current mechanism for the operator to control the behavior of how long a UE can register for an S-NSSAI without using the slice. When a UE registers for an S-NSSAI, it does not inform the network whether it will utilize the slice resources immediately or later after a delay period. Not every UE begins to use slice resources immediately after a successful registration. Depending on UE configuration, the UE may register for all of the configured slice IDs even before its applications start using the slices. In some cases, the UE may wait for an application to make a request for a particular slice before registering with the slice.

Figure 2A:
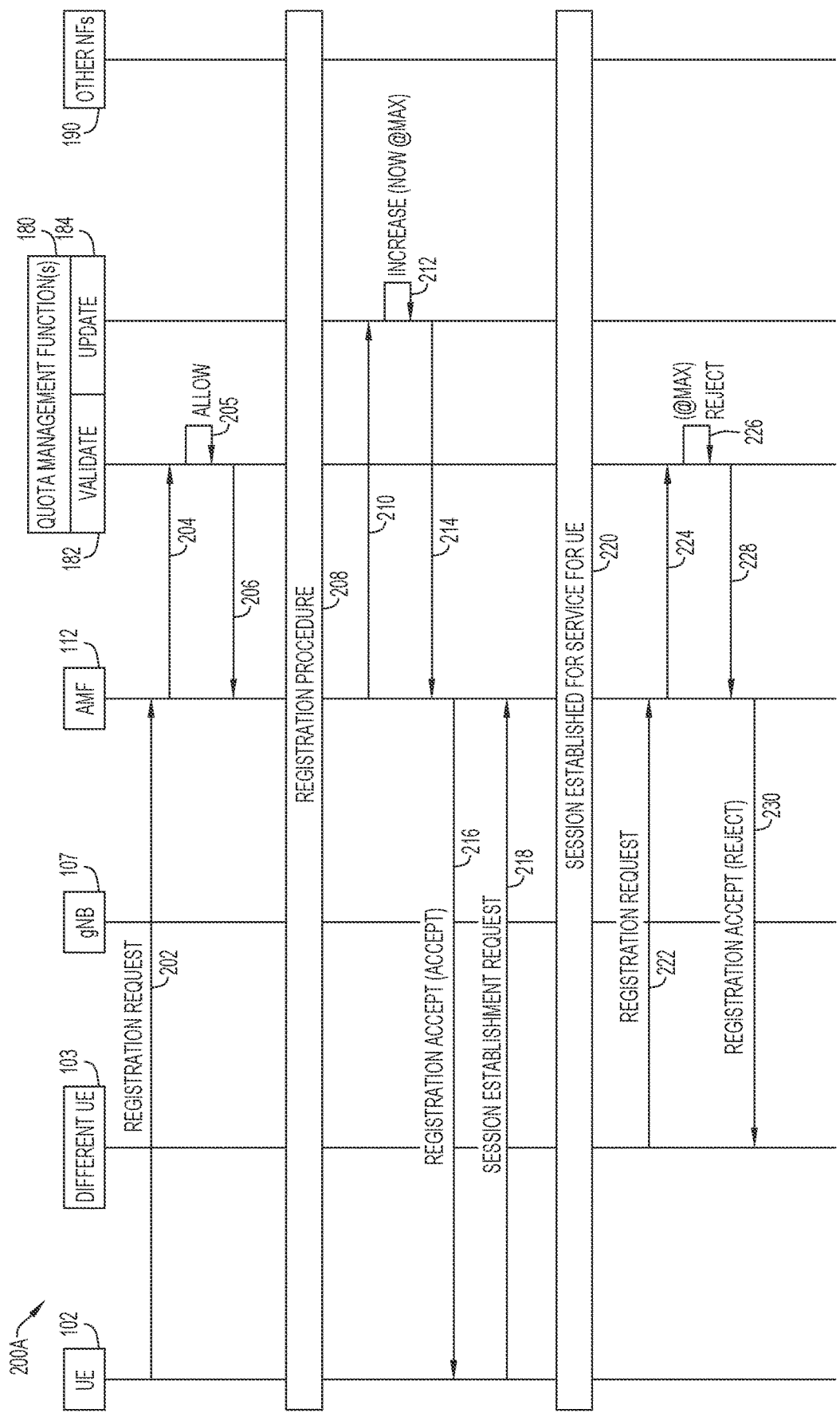
FIG. 2A is a call flow diagram for describing a call flow for slice quota validation according to anticipated conventional operation, where a user equipment (UE) operates to register in a network slice and subsequently establish a session for service via the network slice.

To better illustrate the above, FIG. 2A is a call flow diagram 200A for describing a call flow for slice quota validation according to anticipated conventional operation in a 5G network (e.g. per the study items associated with eNS), where UE 102 operates to register in a network slice and subsequently establish a session for service via the network slice.

In general, the network associated with FIG. 2A is operative to perform a quota validation procedure in relation to a maximum number of UEs permitted in a network slice. As indicated in FIG. 2A and subsequent figures herein, a quota management function(s) 180 may perform such a task. In particular, quota management function 180 may include a quota validation function 182 operative to perform the quota validation procedure in relation to the maximum number of UEs permitted in the network slice. Quota management function 180 may also include a quota update function 184 operative to perform a quota update procedure in relation to a counter of the number of UEs in the network slice.

Although quota management function 180 is shown as a separated dedicated function for reader clarity, its functionality may be provided in a PCF, a UDM, a NSSF, or other NF (e.g. dedicated function or otherwise) (see e.g. other NFs 190). Thus, in actual practice, AMF 112 may cause or perform quota validation or updating by querying an NF, such as a PCF, a UDM, a NSSF, or other NF, which has or serves as quota management function 180. See e.g. 3GPP Release 17 Study Items, 3GPP TR 23.700-40, which describes current solutions associated with eNS.

More particularly, quota update function 184 may operate to perform a quota update procedure in general by maintaining a counter of the number of UEs registered in a given network slice (on a per slice ID basis), increasing the counter in response to a new UE registration in the network slice and decreasing the counter in response to a UE deregistration from the network slice. On the other hand, quota validation function 182 (or quota "enforcement" function) may operate to perform a quota validation procedure (or quota "enforcement" procedure) by validating whether the counter is at the maximum number to allow or reject a newly-requested registration of a UE.

According to anticipated conventional operation in FIG. 2A, UE 102 may send to AMF 112 a message which indicates a registration request for registration (step 202 of FIG. 2A). The message which indicates the registration request may include one or more requested S-NSSAIs associated with one or more network slices in which to register. AMF 112 may receive the message and cause a quota validation procedure to be performed with respect to the S-NSSAIs, with use quota management function 180. Here, AMF 112 may call or query the quota validation function 182 to perform the quota validation procedure for a given S-NSSAI (step 204 of FIG. 2A). In the quota validation procedure, quota validation function 182 may determine that registration should be allowed for the network slice (i.e. the maximum number of UEs has not yet been reached) (step 205 of FIG. 2A), and then return operation to AMF 112 (step 206 of FIG. 2A). In step 208, AMF 112 may obtain an "allow" indication from the quota validation procedure.

In response to the allow indication, AMF 112 may manage or coordinate a registration procedure for assigning one or more resources of the network slice to UE 102 (step 208 of FIG. 2A). Here, various steps outlined in the UE registration procedure of 3GPP TS 23.502 may be utilized in the managing or coordinating of the registration procedure. As UE 102 is registered in the network slice, AMF 112 will also cause a quota update procedure to be performed, with use of quota management function 180. Here, AMF 112 may call or query the quota update function 184 to perform the quota update procedure a given S-NSSAI (step 210 of FIG. 2A). In the quota update procedure, quota update function 184 may increase the counter associated with the S-NSSAI (step 212 of FIG. 2A), and return operation to AMF 112 (step 214 of FIG. 2A). As indicated in FIG. 2A, the counter has now reached to the maximum number of UEs permitted in the network slice ("now @ MAX"). AMF 112 may send to UE 102 a message which indicates a registration accept, indicating an acceptance of registration in the network slice (step 216 of FIG. 2A).

Subsequently (e.g. a short time later), UE 102 may send to AMF 112 a message which indicates a session establishment request for establishing a session via the network slice (step 218 of FIG. 2A). The session to be established may be for communicating data traffic of an application of UE 102. In response, AMF 112 may manage or coordinate a session establishment procedure for establishing the session for service for UE 102 (step 220 of FIG. 2A).

Sometime thereafter, a different UE 103 may send to AMF 112 a message which indicates a registration request for registration in the network slice (step 222 of FIG. 2A). Again, the message which indicates the registration request may include one or more requested S-NSSAIs associated with one or more network slices in which the different UE 103 wants to register. One of the S-NSSAIs is the same S-NSSAI in which the UE 102 just registered. AMF 112 may receive the message and cause a quota validation procedure to be performed with respect to the S-NSSAI, with use quota management function 180. Here, AMF 112 may call or query the quota validation function 182 to perform the quota validation procedure for a given S-NSSAI (step 224 of FIG. 2A). In the quota validation procedure, quota validation function 182 may determine that registration should be rejected for the network slice (i.e. the maximum number of UEs has been reached) (e.g. "@ MAX") (step 226 of FIG. 2A), and return operation to AMF 112 (step 228 of FIG. 2A). In step 228, AMF 112 may obtain an "reject" indication from the quota validation procedure. In response to the reject indication, AMF 112 may reject the registration request of different UE 103, and send to different UE 103 a message which indicates a registration accept with a rejection for registration in the network slice (step 230 of FIG. 2A).

Figure 2B:
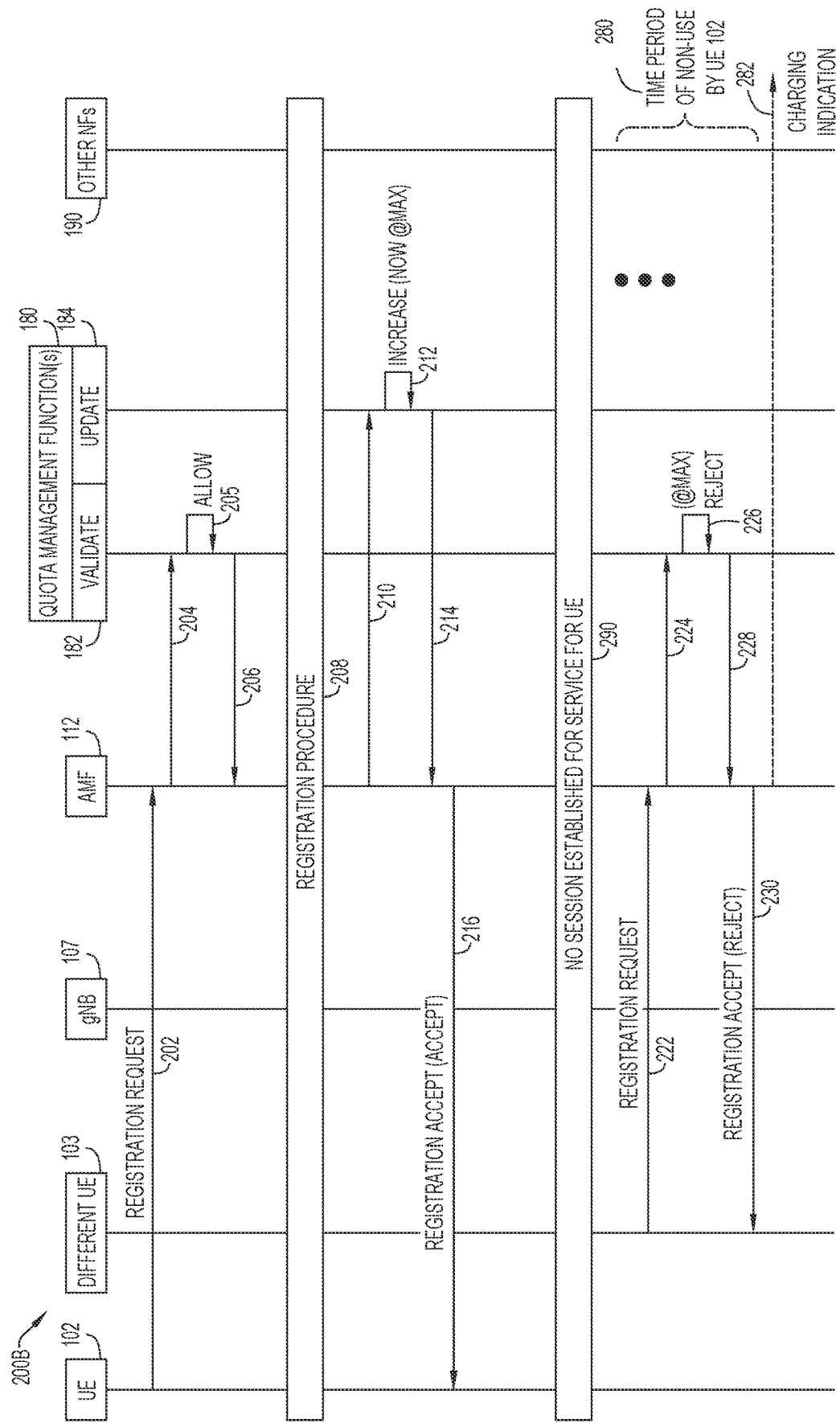
FIG. 2B is a call flow diagram for describing a call flow for slice quota validation according to anticipated conventional operation, where the UE operates to register in the network slice and subsequently refrain from establishing a session for service via the network slice (e.g. for a relatively long period of time)

FIG. 2B is a call flow diagram 200B for describing a call flow for slice quota validation according to anticipated conventional operation (e.g. per the study items associated with eNS), where UE 102 operates to register in the network slice, and subsequently refrain from establishing a session for service via the network slice (e.g. for a relatively long period of time).

Note that the call flow of FIG. 2B is the same as the call flow of FIG. 2A, except that no session is established for service for UE 102 (see step 290 of FIG. 2B), as UE 102 refrains from sending the message which indicates the session establishment request as in step 218 of FIG. 2A. Despite this lack of use of the network slice by UE 102 after its registration, however, the requested registration in the network slice by different UE 103 is still rejected by the network according to anticipated conventional operation. In actual practice, the registration by UE 102 in the network slice without service may be representative of a relatively large number of UEs that register in the network slice without (immediately) requesting service, thereby causing a number of other UEs (e.g. higher priority subscribers or VIPs) that subsequently attempt to register in the network slice for service to be rejected.

What are needed are techniques and mechanisms for improved slice resource management for reducing the negative impacts of slice quotas in mobile networks.

According to some aspects of the present disclosure, a UE may be associated with an indication, such as a "delay hint," to be utilized by the network in a registration procedure for improved slice resource management (e.g. to better manage the S-NSSAI quota). In some implementations, such an indication may exist for each requested S-NSSAI of a UE during registration. As one example, upon identification of such an indication, the network may operate to not immediately assign or delay the assignment of one or network resources of the network slice to the UE, waiting for an anticipated or indicated delay before assigning the one or more network resources to the UE. This may help the network to filter out high or higher priority slices for use by other (e.g. higher priority) UEs or subscribers. In some further or alternative implementations, the network may send a registration accept message to a UE which includes a duration for which registration to each S-NSSAI is valid without invoking service.

Figure 3A:
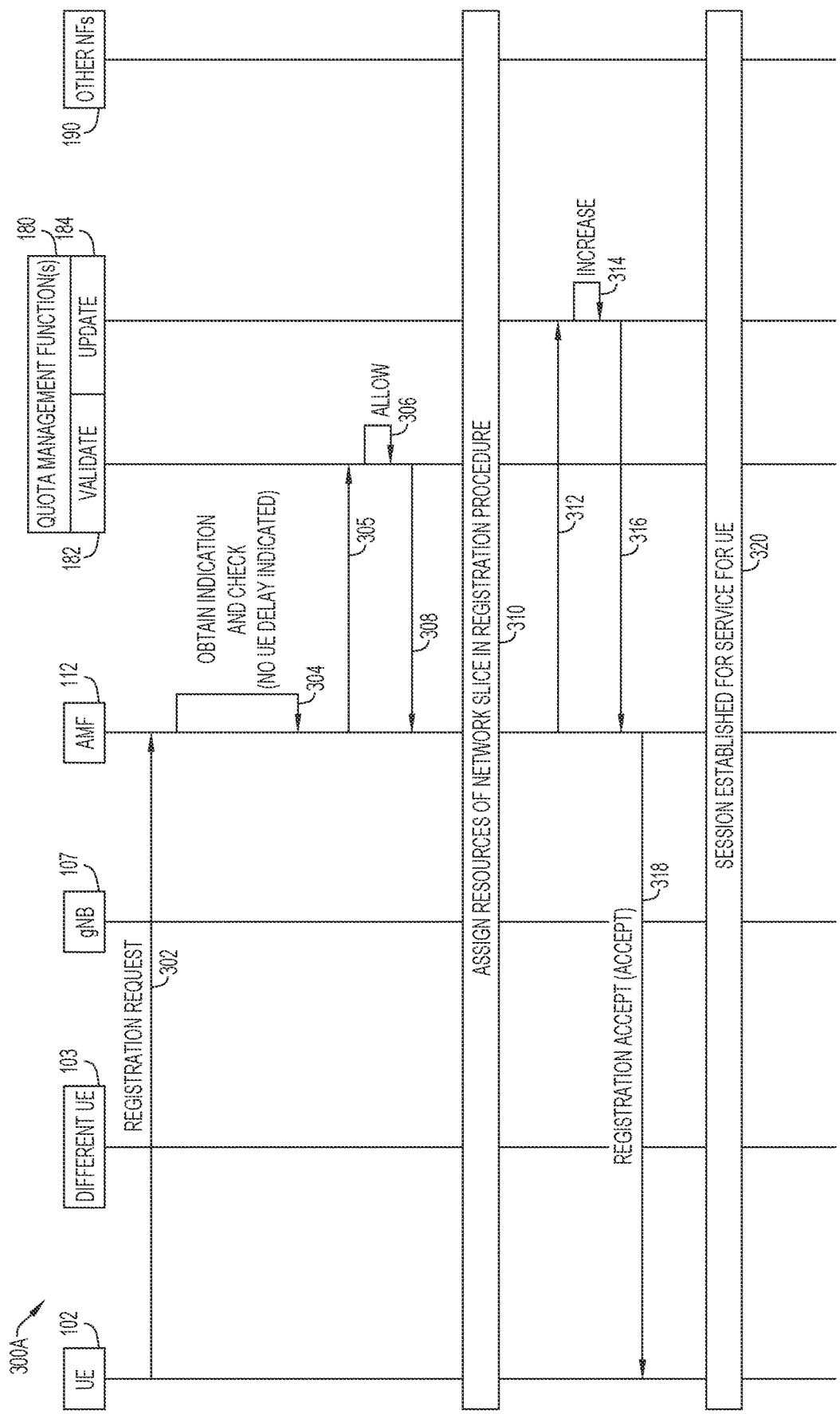
FIG. 3A is a call flow diagram for describing a call flow for improved slice resource management for use with slice quota validation according to some implementations of the present disclosure, where the call flow illustrates a first scenario in which a UE may operate to register in a network slice and subsequently establish a session for service via the network slice, with no UE delay in requesting the service.
Figures 1, 3B:
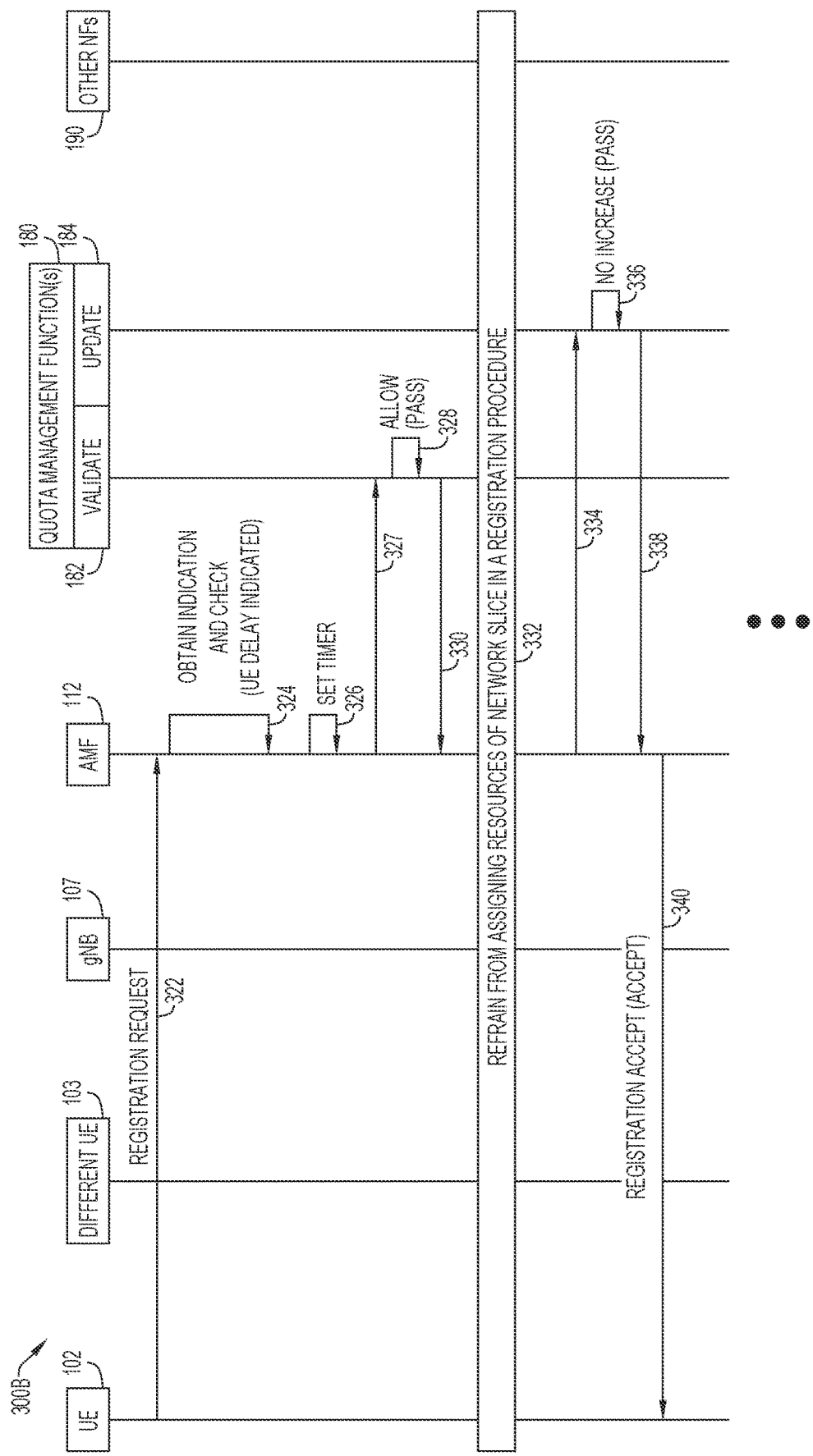
FIG. 3B-1 is a first part of a call flow diagram of a call flow for describing improved slice resource management for use with slice quota validation according to some implementations of the present disclosure, where the call flow illustrates a second scenario in which the UE may operate to register in the network slice and subsequently refrain from establishing a session for service via the network slice (e.g. for a relatively long period of time), with handling of UE delay in requesting the service.
Figures 2, 3B:
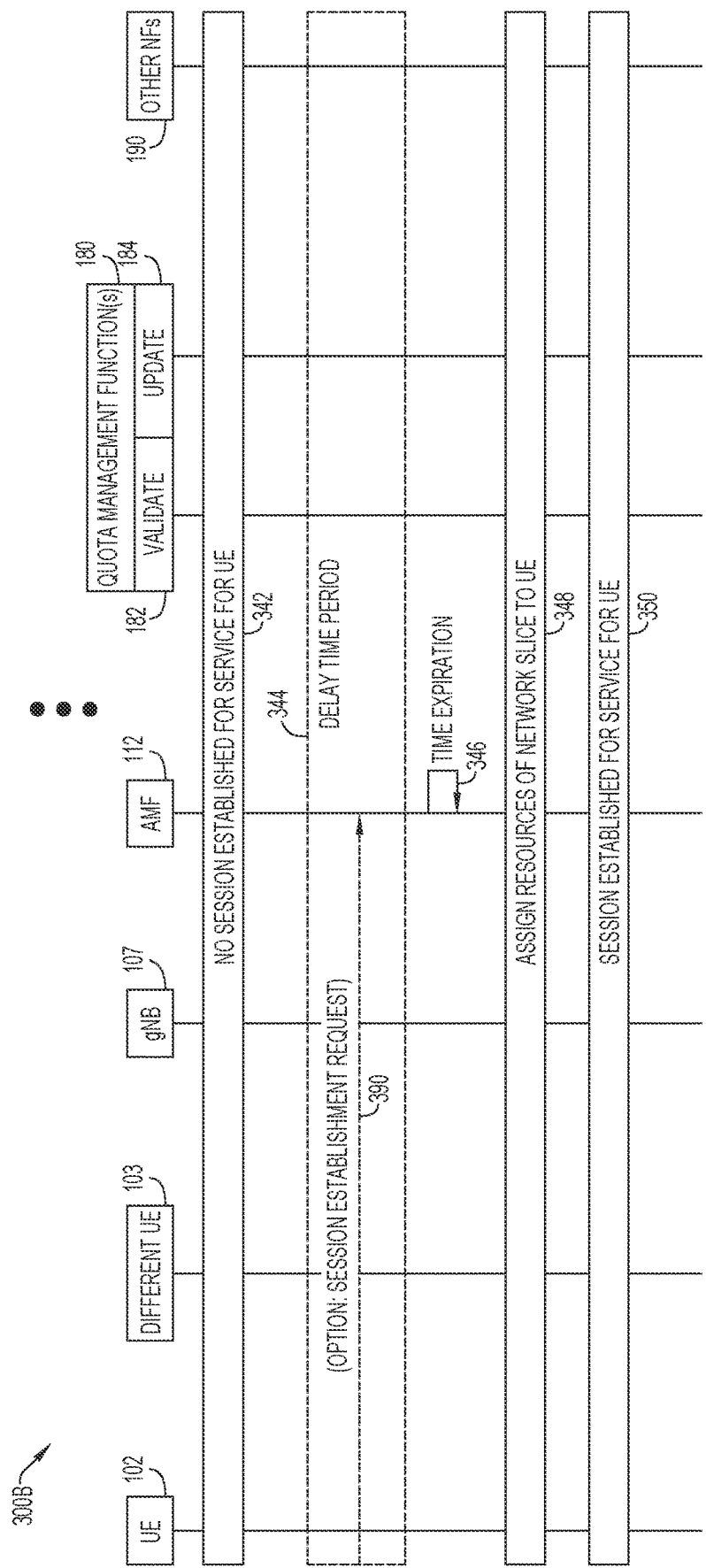
Figures 3, 3B:
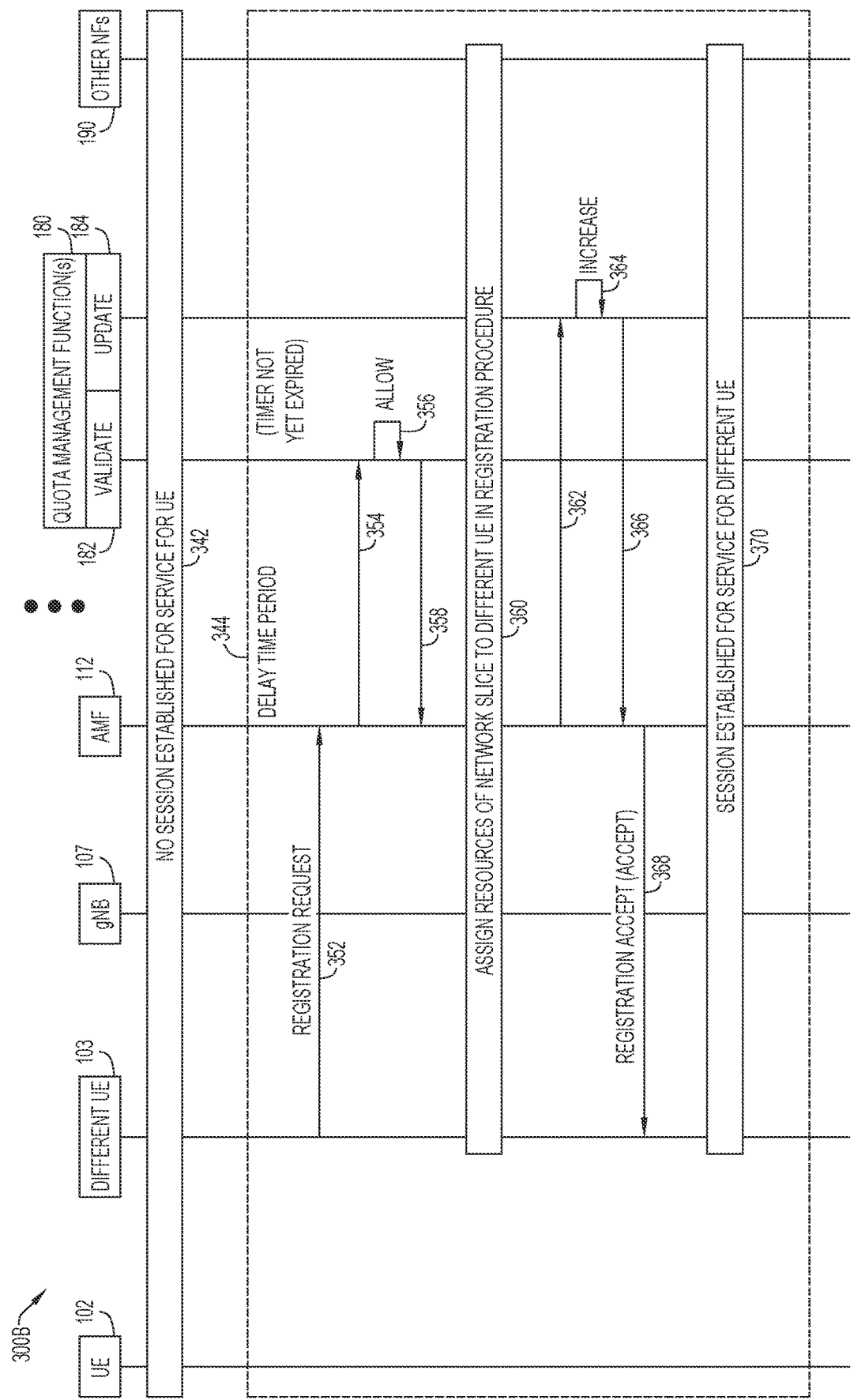
Figure 4:
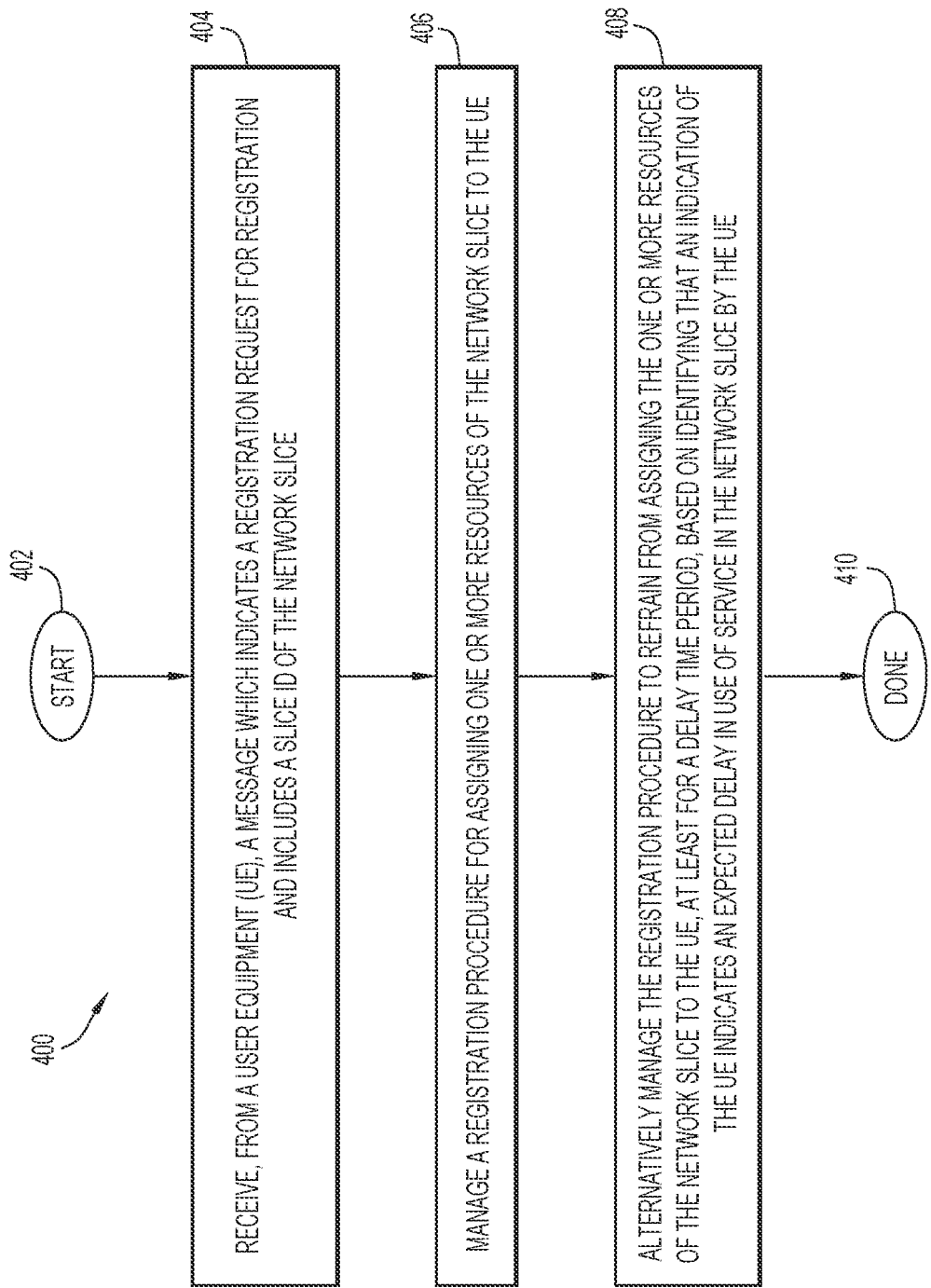
FIG. 4 is a flowchart for describing a method for improved slice resource management for use with slice quota validation according to some implementations of the present disclosure, with handling of UE delay in requesting service according to FIGS. 3B-1 and 3B-2, or FIGS. 3B-1 and 3B-3.

The above-described principles are now described in relation to FIG. 3A, FIGS. 3B-1, 3B-2, and 3B-3, as well as FIG. 4. In these methods, each UE may be associated with an indication which may indicate whether or not it operates with an expected delay in use of service in the network slice by the UE. The indication may be included, for example, in the message which indicates the registration request from the UE, subscription data associated with a subscription of the UE, or usage data of historical network usage by the UE (or by UEs having the same device or application type). In some implementations, the indication is included in the message which indicates the registration request, and indicates the delay time period of the expected delay in use of the service in the network slice by the UE.

FIG. 3A is a call flow diagram 300A for describing a call flow for improved slice resource management for use with slice quota validation according to some implementations of the present disclosure. The call flow of FIG. 3A is associated with a first scenario in which UE 102 may operate to register in a network slice and subsequently establish a session for service via the network slice, with no UE delay in requesting the service. In FIG. 3A, the indication of UE 102 fails to indicate an expected delay in use of service in the network slice by UE 102.

To begin in FIG. 3A, UE 102 may send to AMF 112 a message which indicates a registration request for registration (step 302 of FIG. 3A). The message which indicates the registration request may include one or more requested S-NSSAIs associated with one or more network slices in which to register. AMF 112 may obtain an indication of UE 102 and check it to determine whether or not UE 102 operates with an expected delay in use of service in the network slice (step 304 of FIG. 3A). In the case of FIG. 3A, the indication of UE 102 fails to indicate an expected delay in use of service in the network slice by UE 102.

AMF 112 may then cause a quota validation procedure to be performed with use of quota management function 180. Here, AMF 112 may call or query the quota validation function 182 to perform the quota validation procedure for a given S-NSSAI (step 305 of FIG. 3A). In the quota validation procedure, quota validation function 182 may determine that registration should be allowed for the network slice (i.e. the maximum number of UEs has not yet been reached) (step 306 of FIG. 3A), and then return operation to AMF 112 (step 308 of FIG. 3A). In step 308, AMF 112 may obtain an "allow" indication from the quota validation procedure. In response to the allow indication, AMF 112 may then assign one or more resources of the network slice in a registration procedure for UE 102 (step 310 of FIG. 3A).

As UE 102 is registered in the network slice, AMF 112 will also cause a quota update procedure to be performed with use of quota management function 180. Here, AMF 112 may call or query the quota update function 184 to perform the quota update procedure for a given S-NSSAI (step 312 of FIG. 3A). In the quota update procedure, quota update function 184 may increase the counter associated with the S-NSSAI (step 314 of FIG. 3A), and return operation to AMF 112 (step 316 of FIG. 3A). AMF 112 may send to UE 102 a message which indicates a registration accept, indicating an acceptance of registration in the network slice (step 318 of FIG. 3A).

Subsequently, UE 102 may send to AMF 112 a message which indicates a session establishment request, for establishing a session via the network slice, which may be for communicating data traffic of an application of UE 102 (step 320 of FIG. 3A).

FIG. 3B-1 is a first part of a call flow diagram 300B for describing a call flow for improved slice resource management for use with slice quota validation according to some implementations of the present disclosure. The call flow in FIG. 3B-1 illustrates a second scenario in which UE 102 may operate to register in the network slice and subsequently refrain from establishing a session for service via the network slice (e.g. for a relatively long period of time), with handling of UE delay in requesting the service. In FIG. 3B-1, the indication of UE 102 indicates an expected delay in use of service in the network slice by UE 102 according to the present disclosure.

Beginning the call flow diagram 300B in FIG. 3B-1, UE 102 may send to AMF 112 a message which indicates a registration request for registration (step 322 of FIG. 3B-1). The message which indicates the registration request may include one or more requested S-NSSAIs associated with one or more network slices in which to register. AMF 112 may obtain an indication of UE 102 and check it to determine whether or not UE 102 operates with an expected delay in use of service in the network slice (step 324 of FIG. 3B-1). In the case of FIG. 3B-1, the indication of UE 102 indicates the expected delay in use of service in the network slice by UE 102. In response, AMF 112 causes a timer to be set for delaying for the delay time period of the expected delay (step 326 of FIG. 3B-1). The timer may be stored in association with an identifier of UE 102 and the requested slice ID.

AMF 112 may then cause the quota validation procedure to be performed with use of quota management function 180. Here, AMF 112 may call or query the quota validation function 182 to perform the quota validation procedure for a given S-NSSAI (step 327 of FIG. 3B-1). In the quota validation procedure, quota validation function 182 may determine that registration should be allowed for the network slice (e.g. a "pass" or bypass is allowed) (step 328 of FIG. 3B-1), and then return operation to AMF 112 (step 330 of FIG. 3B-1). In step 330, AMF 112 may obtain an "allow" indication from the quota validation procedure.

As the indication of UE 102 indicates an expected delay in use of service in the network slice, AMF 112 may refrain from assigning one or more resources of the network slice in a registration procedure (step 332 of FIG. 3B-1). AMF 112 may also cause a quota update procedure to be performed with use of quota management function 180. Here, AMF 112 may call or query the quota update function 184 to perform the quota update procedure for a given S-NSSAI (step 334 of FIG. 3B-1). In the quota update procedure, quota update function 184 does not increase the counter associated with the S-NSSAI (e.g. a "pass" or bypass is allowed) (step 336 of FIG. 3B-1), and returns operation to AMF 112 (step 338 of FIG. 3B-1). AMF 112 may send to UE 102 a message which indicates a registration accept, indicating an acceptance of registration in the network slice (step 340 of FIG. 3B-1).

FIG. 3B-2 is a second part of call flow diagram 300B of FIG. 3B-1 for describing the call flow for improved slice resource management for use with slice quota validation according to some implementations of the present disclosure. FIG. 3B-2 illustrates further the second scenario in which a delay time period is expired for the assignment of resources in the network slice for the UE. The steps in FIG. 3B-2 may follow the steps that were previously described in relation to FIG. 3B-1.

In FIG. 3B-2, as the indication of UE 102 indicates an expected delay in use of service in the network slice, UE 102 refrains from sending a message which indicates a session establishment request (e.g. for a relatively long period of time). Therefore, no session is established for service in the network slice for UE 102 (e.g. for a relatively long period of time) (step 342 of FIG. 3B-2). Time will begin to pass (step 344 of FIG. 3B-2), until a time expiration of the delay time period (step 346 of FIG. 3B-2). Upon expiration of the delay time period, AMF 112 may assign the one or more resources of the network slice to UE 102 (step 348 of FIG. 3B-2). Here, various steps outlined in the UE registration procedure of 3GPP TS 23.502 may be utilized in the managing or coordinating of assignment of the one or more resources of the network slice.

Subsequently, UE 102 may send to AMF 112 a message which indicates a session establishment request for establishing a session via the network slice, for communicating data traffic of an application of UE 102 (step 350 of FIG. 3B-2). Alternatively, steps 348 and 350 may be performed in response to UE 102 sending to AMF 112 a message which indicates a session establishment request (i.e. within the delay time period) for establishing a session in the network slice (earlier "option" step 390 of FIG. 3B-2).

FIG. 3B-3 is an alternative second part of call flow diagram 300B for describing the call flow for improved slice resource management for use with slice quota validation according to some implementations of the present disclosure. The call flow of FIG. 3B-3 illustrates a third scenario in which a different UE may operate to, within the delay time period associated with the UE (e.g. FIG. 3B-1), register in the network slice and subsequently establish a session for service via the network slice. The steps in FIG. 3B-3 may follow the steps that were previously described in relation to FIG. 3B-1.

In call flow diagram 300B of FIG. 3B-3, as the indication of UE 102 indicated an expected delay in use of service in the network slice, no session is established for service in the network slice for UE 102 (e.g. for a relatively long period of time) (step 342 of FIG. 3B-3). With this delay time period, different UE 103 may send to AMF 112 a message which indicates a registration request for registration (step 352 of FIG. 3B-3). The message which indicates the registration request may include one or more requested S-NSSAIs associated with one or more network slices in which to register. AMF 112 may cause a quota validation procedure to be performed with use of quota management function 180. Here, AMF 112 may call or query the quota validation function 182 to perform the quota validation procedure for a given S-NSSAI (step 354 of FIG. 3B-3). In the quota validation procedure, quota validation function 182 may determine that registration should be allowed for the network slice (step 356 of FIG. 3B-3), and then return operation to AMF 112 (step 358 of FIG. 3B-3). In step 358, AMF 112 may obtain an "allow" indication from the quota validation procedure. In response, AMF 112 may assign one or more resources of the network slice in a registration procedure for different UE 103 (step 360 of FIG. 3B-3).

As different UE 103 is registered in the network slice, AMF 112 will also cause a quota update procedure to be performed with use of quota management function 180. Here, AMF 112 may call or query the quota update function 184 to perform the quota update procedure for a given S-NSSAI (step 362 of FIG. 3B-3). In the quota update procedure, quota update function 184 may increase the counter associated with the S-NSSAI (step 364 of FIG. 3B-3), and return operation to AMF 112 (step 366 of FIG. 3B-3). AMF 112 may send to UE 102 a message which indicates a registration accept, indicating an acceptance of registration in the network slice (step 368 of FIG. 3B-3). Subsequently, different UE 103 may send to AMF 112 a message which indicates a session establishment request, for establishing a session via the network slice which may be for communicating data traffic of an application of different UE 103 (step 370 of FIG. 3B-3).

FIG. 4 is a flowchart 400 for describing a method for improved slice resource management for use with slice quota validation according to some implementations of the present disclosure. The method may correspond to the techniques described earlier in relation to FIGS. 3B-1, 3B-2, and 3B-3, in handling of the UE delay in requesting service. The method may be for use in a mobile network which is operative to perform a quota validation procedure in relation to a maximum number of UEs permitted in a network slice. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 402 of FIG. 4, the control plane function may receive, from a UE, a message which indicates a registration request for registration and includes a slice ID of the network slice (step 404 of FIG. 4). In response, the control plane function may manage or coordinate a registration procedure for assigning one or more resources of the network slice to the UE (step 406 of FIG. 4). On the other hand, the control plane function may alternatively manage or coordinate the registration procedure to refrain from assigning the one or more resources of the network slice to the UE, at least for a delay time period, based on identifying that an indication of the UE indicates an expected delay in use of service in the network slice by the UE (step 408 of FIG. 4). In some implementations, step 404 may be performed based on failing to identify an indication of the UE which indicates an expected delay in use of service in the network slice by the UE. The flowchart 400 may be completed at a done block 410 of FIG. 4.

In some implementations, the indication which indicates the expected delay in use of service in the network slice may be included, for example, in the message which indicates the registration request from the UE; subscription data associated with a subscription of the UE; or usage data of historical network usage by the UE (or by UEs having the same device or application type). In some implementations, the indication is included in the message which indicates the registration request and indicates the delay time period of the expected delay in use of the service in the network slice by the UE.

In some implementations, in managing the registration procedure for assigning the one or more resources of the network slice to the UE in step 406, the control plane function may cause a quota update procedure to be performed for increasing a count of a number of UEs in the network slice. In some implementations, in alternatively managing the registration procedure to refrain from assigning the one or more resources of the network slice to the UE in step 408, the control plane function may refrain from the increasing of the count of the number of UEs in the network slice in the quota update procedure.

In some implementations, in the alternatively managing the registration procedure in step 408, the control plane function may cause a timer to be set for delaying for the delay time period of the expected delay and, upon expiration of the time period, assign the one or more resources of the network slice to the UE. In some implementations, the control plane function may cause a timer to be set for delaying for the delay time period of the expected delay and, upon expiration of the delay time period, assign the one or more resources of the network slice to a different UE associated with a first indication which indicates a first level of service, priority, or subscription rather than the UE which is associated with a second indication which indicates a second level of service, priority, or subscription.

In some implementations, after alternatively managing the registration procedure to refrain from assigning the one or more resources of the network slice to the UE, at least for the delay time period, the control plane function may receive, from the UE within the delay time period, a message which indicates a request for establishing a session in the network slice and, in response to the request for establishing the session in the network slice, assign the one or more resources of the network slice to the UE and manage a session establishment procedure for establishing the session for the UE with use of the one or more resources of the network slice.

In some implementations, in the registration procedure for assigning the one or more resources of the network slice to the UE, the control plane function may send, to the UE, a message which indicates a registration accept and includes a delay time period, cause a timer to be set for delaying for the delay time period, and, upon expiration of the delay time period, de-assign/un-assign the one or more resources of the network slice from the UE. In some implementations, in alternatively managing of the registration procedure to refrain from assigning the one or more resources of the network slice to the UE, the control plane function may send, to the UE, a message which indicates a registration accept and includes a delay time period, cause a timer to be set for delaying for the delay time period of the expected delay, and, upon expiration of the delay time period, assign the one or more resources of the network slice to the UE.

In some implementations, in managing the registration procedure for assigning the one or more resources of the network slice to the UE, the control plane function may cause charging data to be communicated to a charging function after UE registration, where the charging data includes a charging indication for charging according to use of the network slice without service being invoked.

Figure 5A:
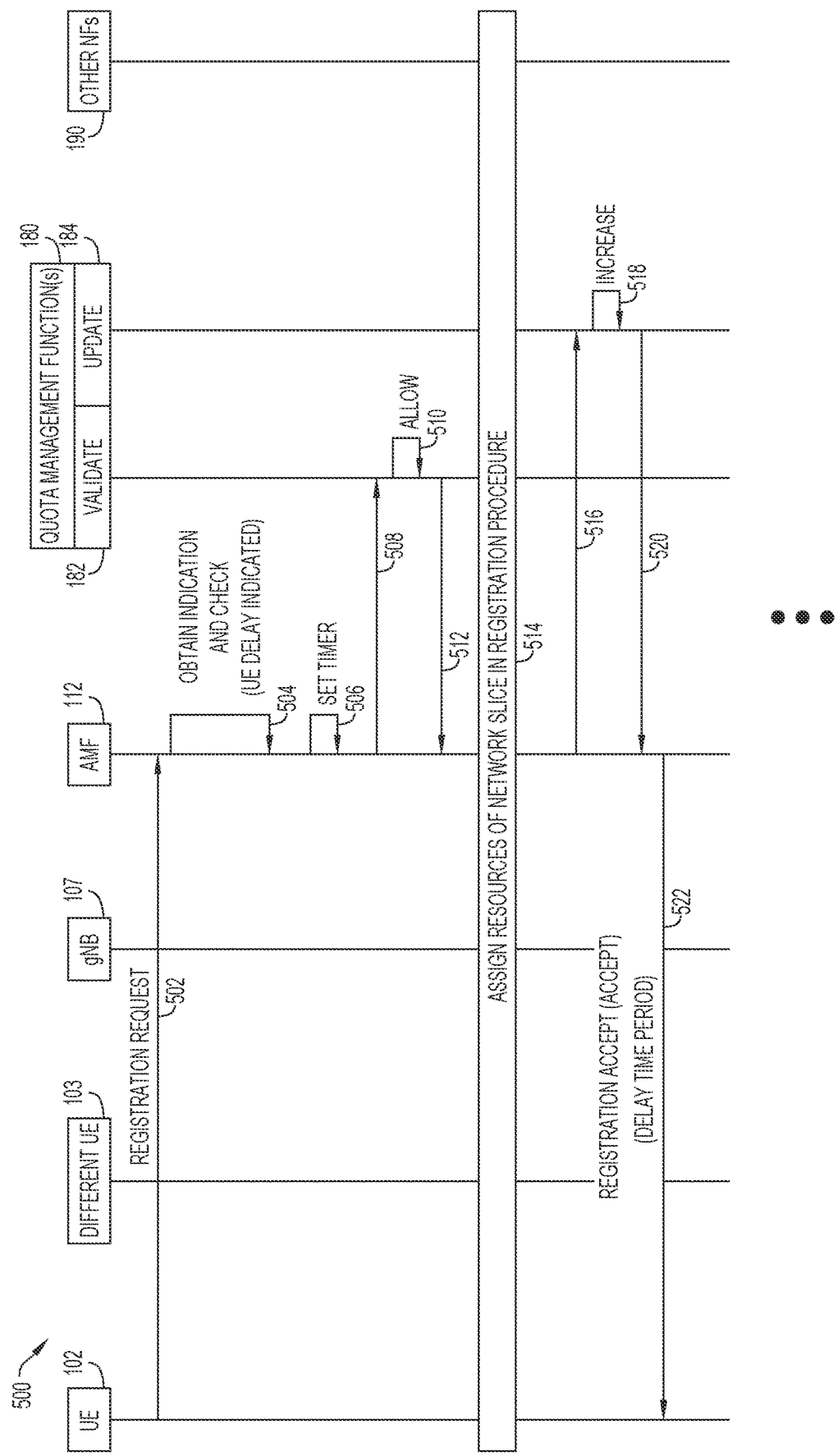
FIGS. 5A and 5B form a call flow diagram for describing a call flow for improved slice resource management for use with slice quota validation according to some implementations, where the network operates to provide the UE with a delay time period in which to request service in the network slice.
Figure 5B:
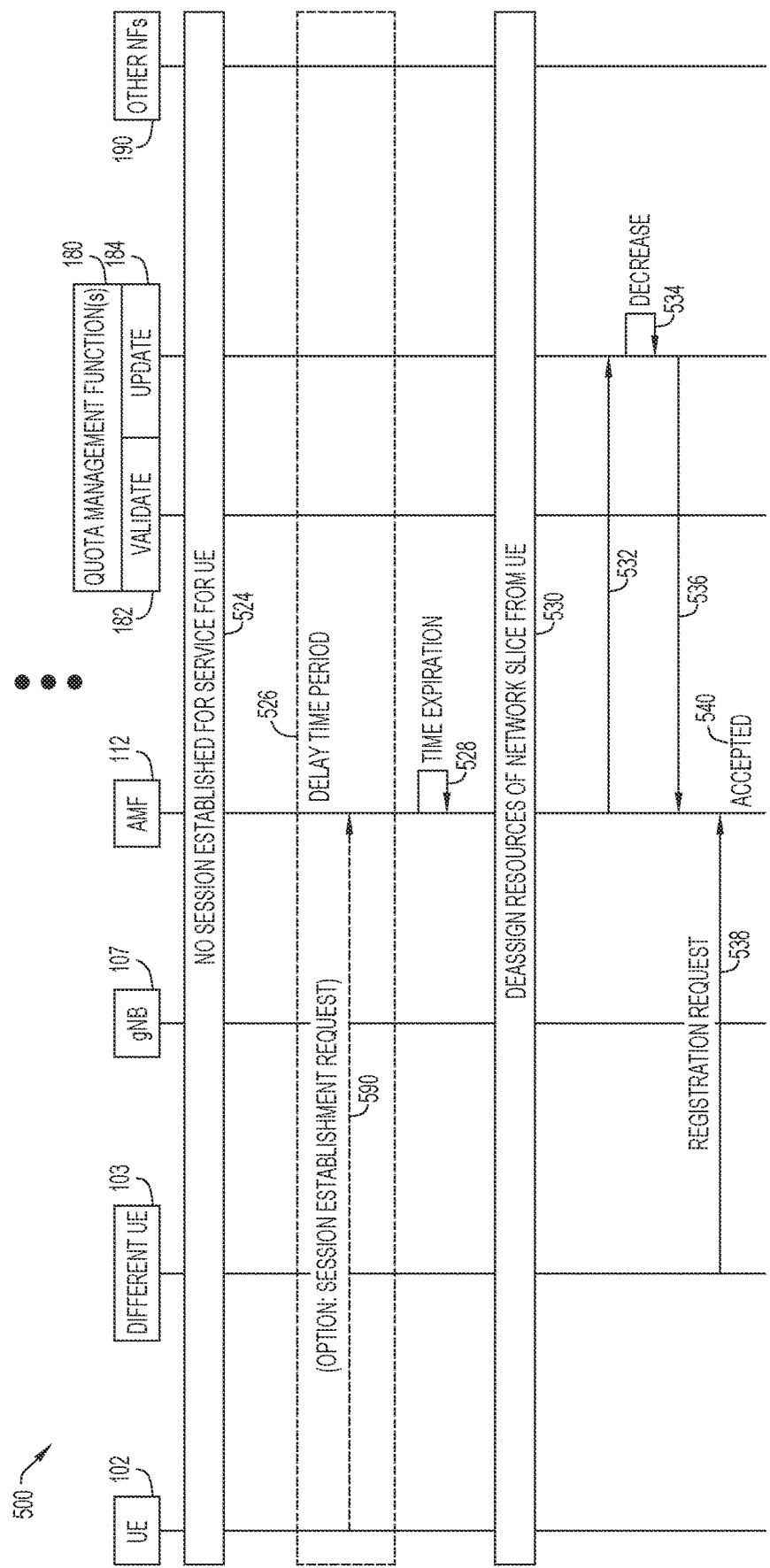
Figure 6:
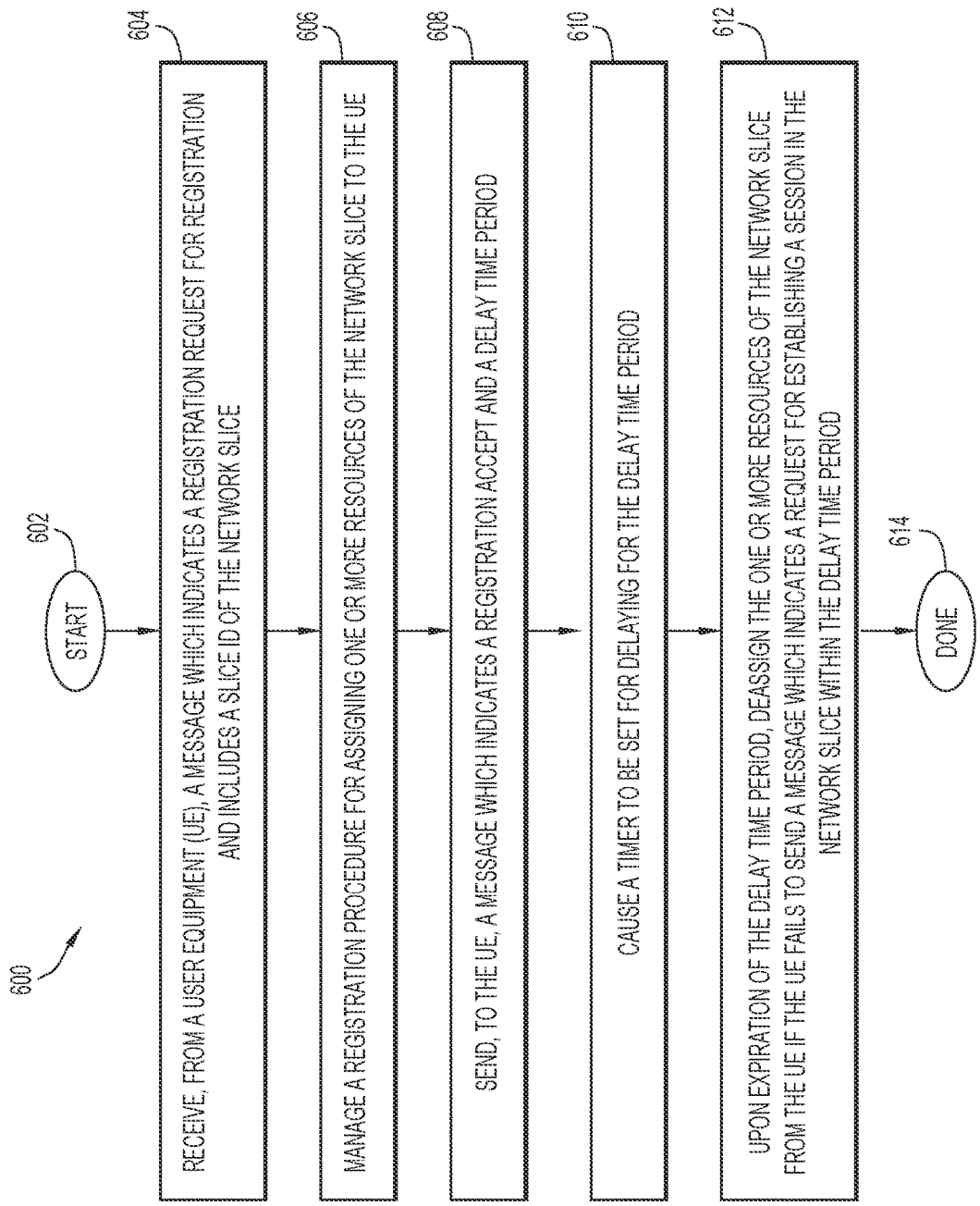
FIG. 6 is a flowchart for describing a method for improved slice resource management for use with slice quota validation according to some implementations, where the network operates to provide the UE with the delay time period in which to request service in the network slice, which may correspond to the call flow diagram of FIGS. 5A-5B.

In the methods to be described now in relation to FIGS. 5A-5B and 6, the network operates to perform a registration procedure for assigning resources of the network slice to the UE in response to a registration request from a UE, sending to the UE a message which indicates a registration accept which further includes a delay time period within which a UE is expected to request service in the network slice.

FIGS. 5A-5B form a call flow diagram 500 for describing a call flow for improved slice resource management for use with slice quota validation according to some implementations, where the network operates to provide the UE 102 with a delay time period (e.g. a predetermined delay time period) in which to request service in the network slice. In FIGS. 5A-5B, the indication of UE 102 indicates an expected delay in use of service in the network slice by UE 102.

To begin in FIG. 5A, UE 102 may send to AMF 112 a message which indicates a registration request for registration (step 502 of FIG. 5A). The message which indicates the registration request may include one or more requested S-NSSAIs associated with one or more network slices in which to register. AMF 112 may obtain an indication of UE 102 and check it to determine whether or not UE 102 operates with an expected delay in use of service in the network slice (step 504 of FIG. 5A). In the case of FIG. 5A, the indication of UE 102 does indicate an expected delay in use of service in the network slice by UE 102. In response, AMF 112 causes a timer to be set for delaying for the delay time period of the expected delay (step 506 of FIG. 5A). The timer may be stored in association with an identifier of UE 102 and the requested slice ID.

AMF 112 may then cause a quota validation procedure to be performed with use of quota management function 180. Here, AMF 112 may call or query the quota validation function 182 to perform the quota validation procedure for a given S-NSSAI (step 508 of FIG. 5A). In the quota validation procedure, quota validation function 182 may determine that registration should be allowed for the network slice (i.e. the maximum number of UEs has not yet been reached) (step 510 of FIG. 5A), and then return operation to AMF 112 (step 512 of FIG. 5A). In step 512, AMF 112 may obtain an "allow" indication from the quota validation procedure. In response to the allow indication, AMF 112 may assign one or more resources of the network slice in a registration procedure for UE 102 (step 514 of FIG. 5A). Here, various steps outlined in the UE registration procedure of 3GPP TS 23.502 may be utilized in the managing or coordinating of the assignment of resources.

As UE 102 is registered in the network slice, AMF 112 will also cause a quota update procedure to be performed with use of quota management function 180. Here, AMF 112 may call or query the quota update function 184 to perform the quota update procedure for a given S-NSSAI (step 516 of FIG. 5A). In the quota update procedure, quota update function 184 may increase the counter associated with the S-NSSAI (step 518 of FIG. 5A), and return operation to AMF 112 (step 520 of FIG. 5A). AMF 112 may send to UE 102 a message which indicates a registration accept, indicating an acceptance of registration in the network slice (step 522 of FIG. 5A). Notably, the message which indicates the registration accept may include the delay time period within which UE 102 is expected to request service in the network slice (e.g. a predetermined delay time period).

Continuing the call flow diagram 500 in FIG. 5B, as the indication of UE 102 indicates an expected delay in use of service in the network slice, UE 102 refrains from sending a message which indicates a session establishment request (e.g. for a period of time). Therefore, no session is established for service in the network slice for UE 102 (e.g. for a period of time) (step 524 of FIG. 5B). Time will begin to pass over the delay time period (step 526 of FIG. 5B) until a time expiration of the delay time period (step 528 of FIG. 5B). Upon expiration of the delay time period, AMF 112 may deassign the one or more resources of the network slice from UE 102 (step 530 of FIG. 5B). As UE 102 is deregistered from the network slice, AMF 112 will also cause a quota update procedure to be performed with use of quota management function 180. Here, AMF 112 may call or query the quota update function 184 to perform the quota update procedure for a given S-NSSAI (step 532 of FIG. 5B). In the quota update procedure, quota update function 184 may decrease the counter associated with the S-NSSAI (step 534 of FIG. 5B), and return operation to AMF 112 (step 536 of FIG. 5B).

Subsequently, the deregistration and/or deassignment of resources of the network slice for UE 102 may allow a subsequent registration request from different UE 103 (step 538 of FIG. 5B) to be served and accepted (step 540 of FIG. 5B). Alternatively, steps 530 through 540 may be performed in response to UE 102 sending to AMF 112 a message which indicates a session establishment request (i.e. within the delay time period) for establishing a session in the network slice (earlier "option" step 590 of FIG. 5B).

FIG. 6 is a flowchart 600 for describing a method for improved slice resource management for use with slice quota validation according to some implementations, where the network operates to provide UE 102 with a delay time period (e.g. a predetermined delay time period) in which to request service in the network slice. The method may correspond to the techniques described above in relation to FIGS. 5A-5B. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 602 of FIG. 6, the control plane function may receive, from a UE, a message which indicates a registration request for registration and includes a slice ID of the network slice (step 604 of FIG. 6). The control plane function may manage or coordinate a registration procedure for assigning one or more resources of the network slice to the UE (step 606 of FIG. 6). The control plane function may send, to the UE, a message which indicates a registration accept and a delay time period (e.g. a predetermined delay time period) (step 608 of FIG. 6). The control plane function may cause a timer to be set for delaying for the delay time period (step 610 of FIG. 6). The control plane function may, upon expiration of the delay time period, deassign the one or more resources of the network slice from the UE if the UE fails to send a message which indicates a request for establishing a session in the network slice within the delay time period (step 612 of FIG. 6). The flowchart 600 may be completed at a done block 614 of FIG. 6.

According to other aspects of the present disclosure, network policy for improved quota management may be utilized. In the current 5G architecture, all UEs served by a network slice and all PDU sessions of a UE are generally treated in the same manner. Such general treatment limits the network capability to properly manage the slice quota. According to other aspects of the present disclosure, a new network policy may be in order to treat every UE (or some UEs) served by the slice differently. In addition or as an alternative, different PDU sessions that are established by the UEs may be treated differently in the network. Using such network policy, the network may prioritize UEs or sessions within the UE differently for better quota management.

As one example, the network may treat UEs differently based on subscription data associated with each UE. For example, a first UE may be associated with a "GOLD" subscription, a second UE may be associated with a "SILVER" subscription, and a third UE may be associated with a "BRONZE" subscription. The network may assign and/or carry out different priority handling processing for different UEs based on the subscription data. In case of overload conditions, the network may use this subscription data (or indications thereof) to prioritize one UE or subscriber over another. In the case where a network slice is overloaded, for example, "GOLD" subscribers may be prioritized over "SILVER" and "BRONZE" subscribers.

As another example, the network may be configured to prioritize between different PDU sessions of the UEs based on the same or other information, such as different DNNs that are associated with the PDU sessions. If there is a network slice serving DNN1, DNN2 and DNN3, for example, then the network slice may be configured to prioritize the PDU session for DNN1 over DNN2 and DNN3.

As yet another example, the network may choose to unregister a network slice from a given UE when the quota limit is reached, in order to provide the slice resources to some other UE (e.g. a higher priority UE). Subsequently, when the slice load normalizes, the network may re-register the previous UE again after the slice is made available again.

In the methods to be described now in relation to FIG. 7A, FIGS. 7B-1, 7B-2, and 7B-3, and FIG. 8A, priority-based network slice registration amongst UEs (e.g. between UE 102 and different UE 103) are described.

Figure 7A:
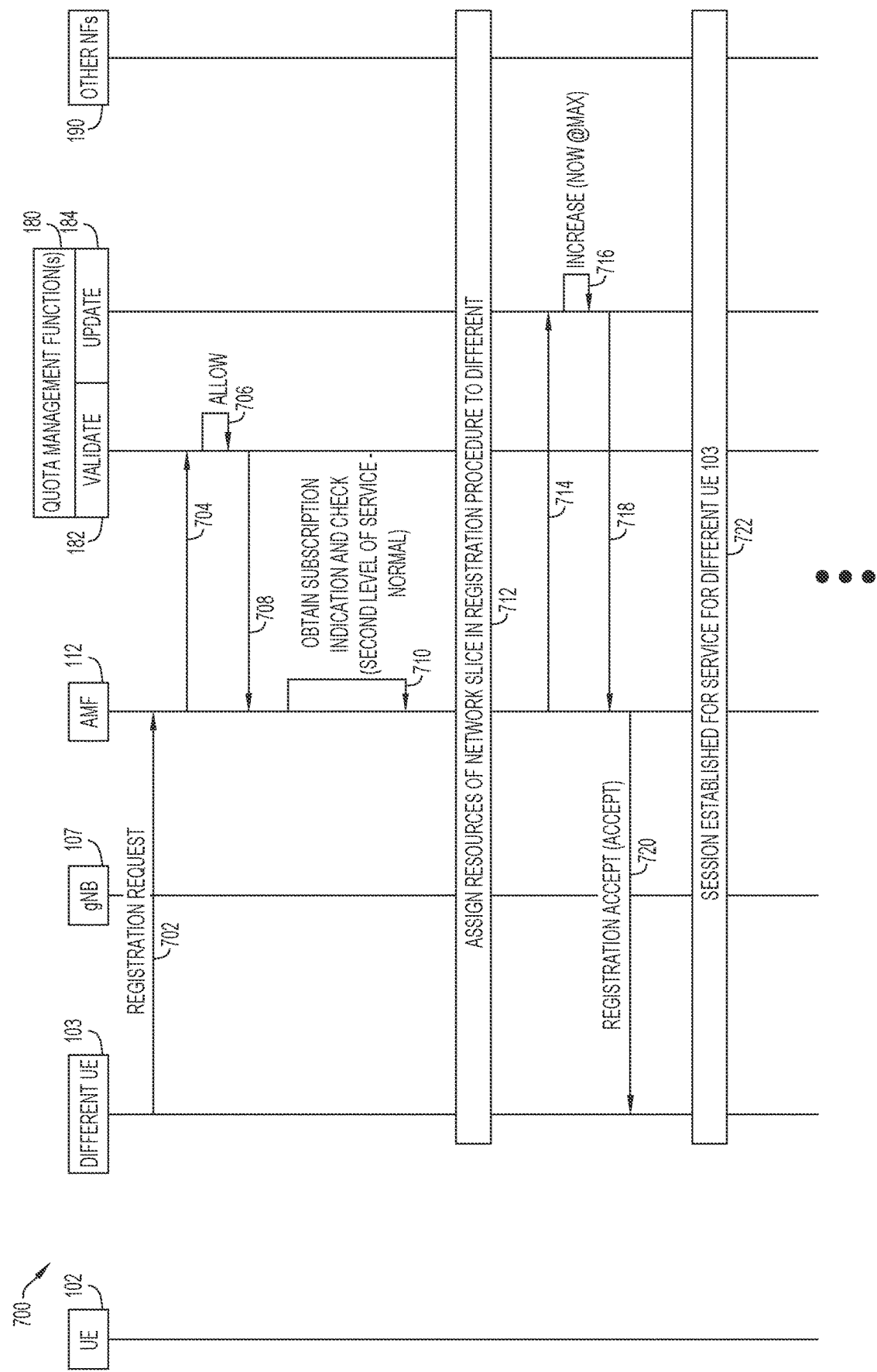
FIG. 7A is a first part of a call flow diagram for describing a call flow for improved slice resource management for use with slice quota validation according to some implementations, where the network operates to register and provide service to a different UE in the mobile network.

FIG. 7A is a first part of a call flow diagram 700 of a call flow for improved slice resource management for use with slice quota validation according to some implementations, where the network operates to register and provide service to the different UE 103 in the mobile network.

UE 102 of FIG. 7A may be associated with a first indication which indicates a first level of service, priority, or subscription. On the other hand, different UE 103 may be associated with a second indication which indicates a second level of service, priority, or subscription. In some implementations, the first indication which indicates the first level of service, priority, or subscription may be a better or higher level of service, priority, or subscription than the second level of service, priority, or subscription. For example, the first indication may represent a "GOLD" service level and the second indication may represent a "SILVER" service level. In some implementations, each one of UE 102 and different UE 103 has subscription data associated with a subscription, and each indication is a subscription indication in the subscription data. In some implementations, the indications may be provided as network policies in the mobile network.

To begin in FIG. 7A, different UE 103 may send to AMF 112 a message which indicates a registration request for registration (step 702 of FIG. 7A). The message which indicates the registration request may include one or more requested S-NSSAIs associated with one or more network slices in which to register. AMF 112 may cause a quota validation procedure to be performed with use of quota management function 180. Here, AMF 112 may call or query the quota validation function 182 to perform the quota validation procedure for a given S-NSSAI (step 704 of FIG. 7A). In the quota validation procedure, quota validation function 182 may determine that registration should be allowed for the network slice (i.e. the maximum number of UEs has not yet been reached) (step 706 of FIG. 7A), and then return operation to AMF 112 (step 708 of FIG. 7A). In step 708, AMF 112 may obtain an "allow" indication from the quota validation procedure. In response, AMF 112 may also obtain the indication of different UE 103 and may check it to determine a level of service, priority, or subscription associated with it (step 710 of FIG. 7A). In some implementations, the indication is a subscription indication which indicates that different UE 103 is associated with the second level of service, priority, or subscription.

AMF 112 may then assign one or more resources of the network slice in a registration procedure for UE 102 (step 712 of FIG. 7A). As UE 102 is registered in the network slice, AMF 112 will cause a quota update procedure to be performed with use of quota management function 180. Here, AMF 112 may call or query the quota update function 184 to perform the quota update procedure for a given S-NSSAI (step 714 of FIG. 7A). In the quota update procedure, quota update function 184 may increase the counter associated with the S-NSSAI (step 716 of FIG. 7A), and return operation to AMF 112 (step 718 of FIG. 7A). As indicated in FIG. 7A, the counter has now reached to the maximum number of UEs permitted in the network slice ("now @ MAX"). AMF 112 may send to different UE 103 a message which indicates a registration accept, indicating an acceptance of registration in the network slice (step 720 of FIG. 7A). Subsequently, different UE 103 may send to AMF 112 a message which indicates a session establishment request for establishing a session via the network slice, which may be for communicating data traffic of an application of different UE 103 (step 722 of FIG. 7A).

Figures 1, 7B:
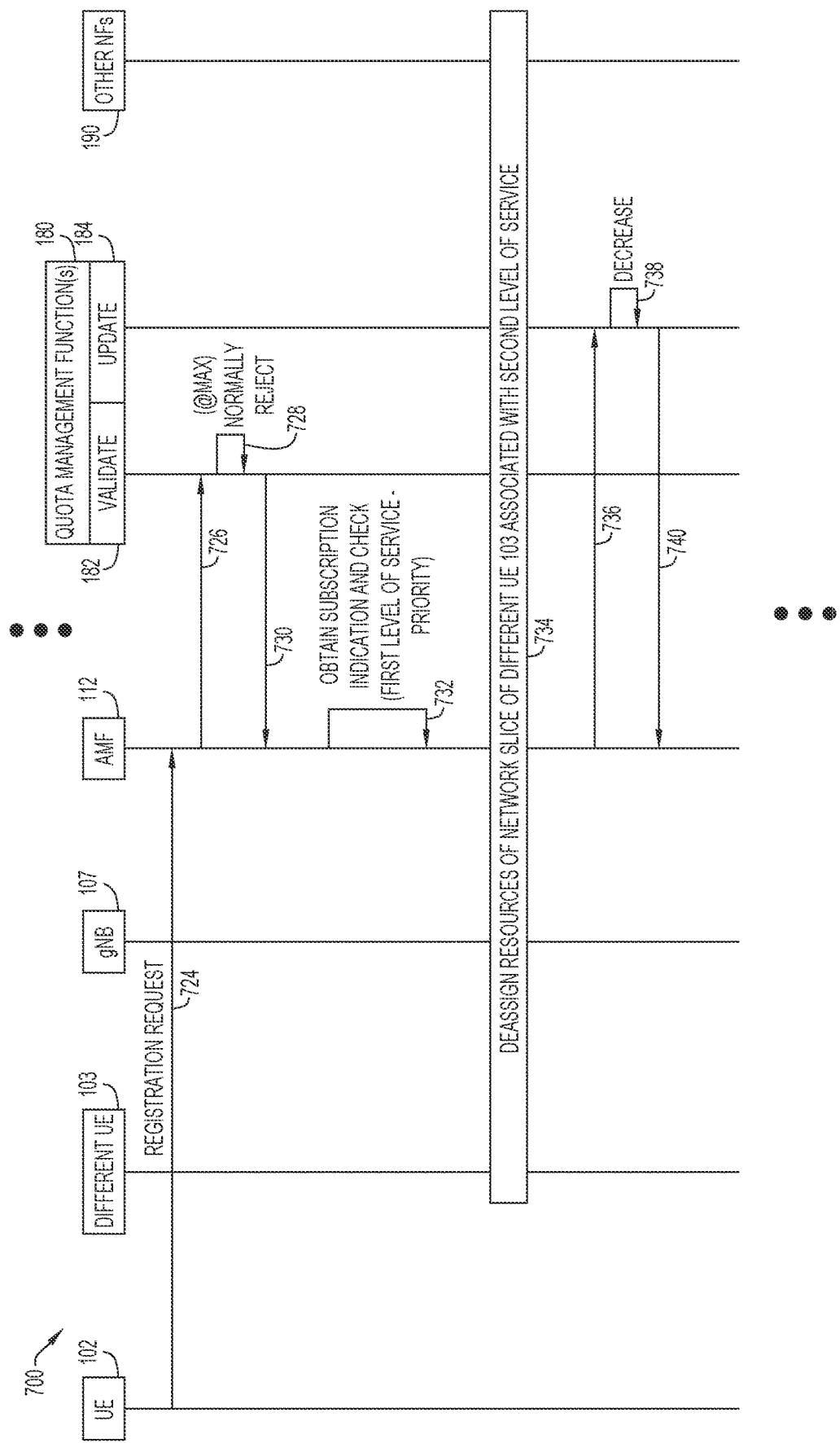
Figures 2, 7B:
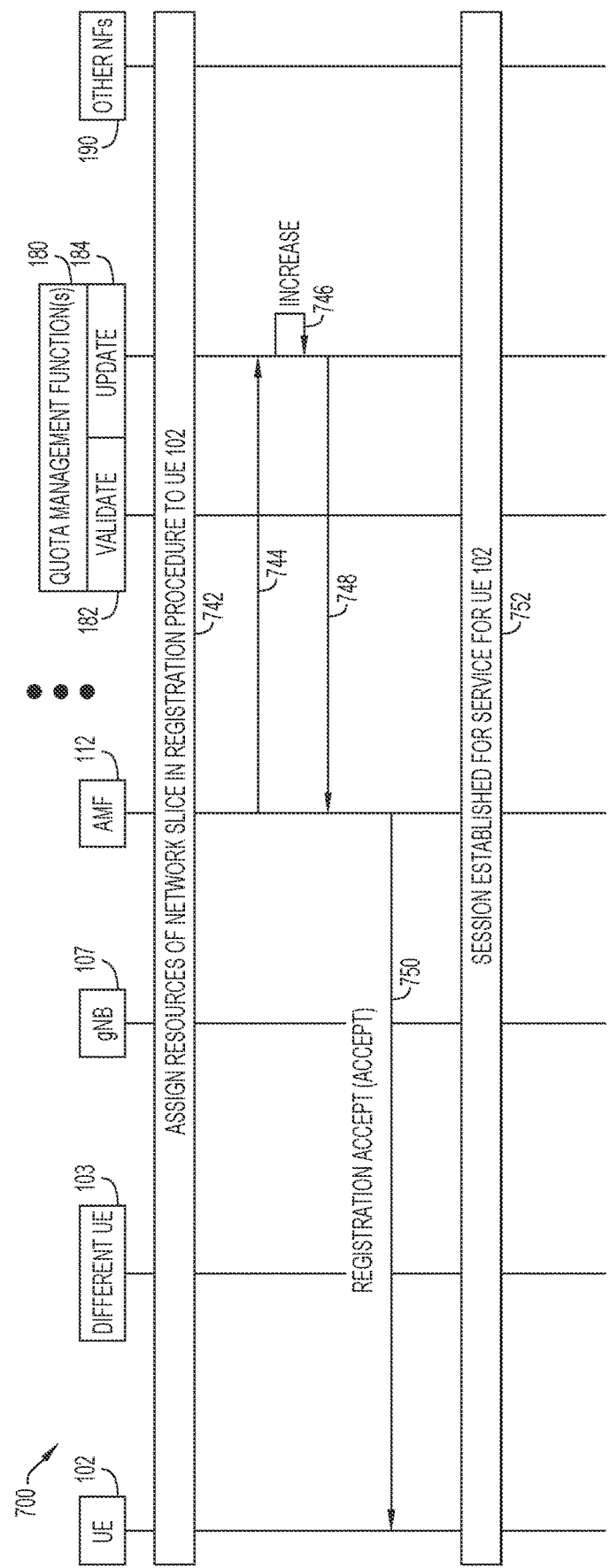

FIGS. 7B-1 and 7B-2 form a second part of call flow diagram 700 of the call flow that begins with the first part in FIG. 7A, for improved slice resource management for use with slice quota validation according to some implementations, where the network operates to prioritize network slice registration of UE 102 associated with the first level of service over the different UE 103 which is associated with the second level of service. In some implementations, the network may be configured to prioritize between different PDU sessions of the UEs based on priorities associated with different DNNs associated with the PDU sessions. The steps in call flow diagram 700 of FIGS. 7B-1 and 7B-2 may follow the steps in call flow diagram 700 of FIG. 7A.

To begin in FIG. 7B-1, UE 102 may send to AMF 112 a message which indicates a registration request for registration (step 724 of FIG. 7B-1). The message which indicates the registration request may include one or more requested S-NSSAIs associated with one or more network slices in which to register. AMF 112 may cause a quota validation procedure to be performed with use of quota management function 180. Here, AMF 112 may call or query the quota validation function 182 to perform the quota validation procedure for a given S-NSSAI (step 726 of FIG. 7B-1). In the quota validation procedure, quota validation function 182 may determine that registration should be rejected for the network slice (i.e. the maximum number of UEs has been reached) (e.g. "@ MAX") (step 728 of FIG. 7B-1), and return operation to AMF 112 (step 730 of FIG. 7B-1). In step 730, AMF 112 may obtain a "reject" indication from the quota validation procedure.

AMF 112 may also obtain the indication of UE 102 and may check it to determine a level of service, priority, or subscription associated with UE 102 (step 732 of FIG. 7B-1). In some implementations, the indication is a subscription indication which indicates that UE 102 is associated with the first level of service, priority, or subscription. Here, the first indication of UE 102 which indicates the first level of service, priority, or subscription is a better or higher level of service, priority, or subscription than the second level of service, priority, or subscription indicated by the second indication of different UE 103.

Normally, the network would reject the registration request of UE 102 based on the reject indication from the quota validation procedure. Based on the differences in priorities, however, AMF 112 may manage or coordinate a deassigning of the resources of the network slice from different UE 103 in a deregistration procedure (step 734 of FIG. 7B-1). AMF 112 will also cause a quota update procedure to be performed with use of quota management function 180. Here, AMF 112 may call or query the quota update function 184 to perform the quota update procedure for a given S-NSSAI (step 736 of FIG. 7B-1). In the quota update procedure, quota update function 184 may decrease the counter associated with the S-NSSAI (step 738 of FIG. 7B-1), and return operation to AMF 112 (step 740 of FIG. 7B-1).

Continuing the call flow diagram 700 in FIG. 7B-2, AMF 112 may then assign one or more resources of the network slice in a registration procedure for UE 102 (step 742 of FIG. 7B-2). Here, various steps outlined in the UE registration procedure of 3GPP TS 23.502 may be utilized in the managing or coordinating of assignment of the one or more resources of the network slice. As UE 102 is registered in the network slice, AMF 112 will also cause a quota update procedure to be performed with use of quota management function 180. Here, AMF 112 may call or query the quota update function 184 to perform the quota update procedure for a given S-NSSAI (step 744 of FIG. 7B-2). In the quota update procedure, quota update function 184 may increase the counter associated with the S-NSSAI (step 746 of FIG. 7B-2), and return operation to AMF 112 (step 748 of FIG.

7B-2). AMF 112 may send to UE 102 a message which indicates a registration accept, indicating an acceptance of registration in the network slice (step 750 of FIG. 7B-2). Subsequently, UE 102 may send to AMF 112 a message which indicates a session establishment request, for establishing a session via the network slice which may be for communicating data traffic of an application of UE 102 (step 752 of FIG. 7B-2).

In some implementations of FIG. 7A and FIGS. 7B-1 and 7B-2, AMF 112 may manage or coordinate the (automatic) reassigning of the one or more resources of the network slice to different UE 103 associated with the second level of service, priority, or subscription, based on subsequently identifying the count of the quota validation procedure to be less than the maximum number of UEs permitted in the network slice.

Figure 7C:
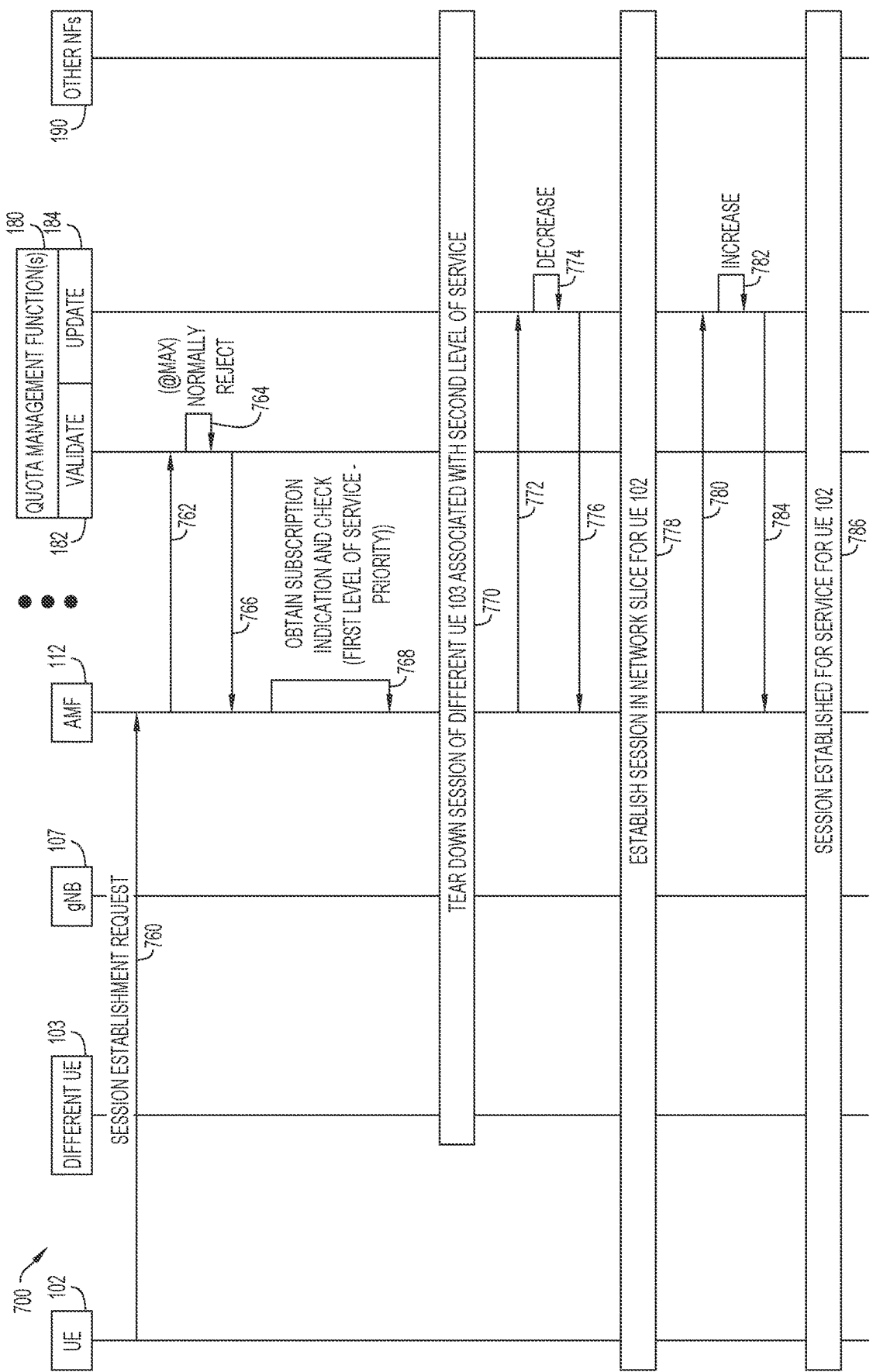
FIG. 7C is an alternative second part of the call flow diagram of FIG. 7A for describing the call flow for improved slice resource management for use with slice quota validation according to some implementations, where the network operates to prioritize a session of the UE associated with the first level of service, priority, or subscription over a different session of the different UE associated with the second level of service, priority, or subscription per FIG. 7A.
Figure 8A:
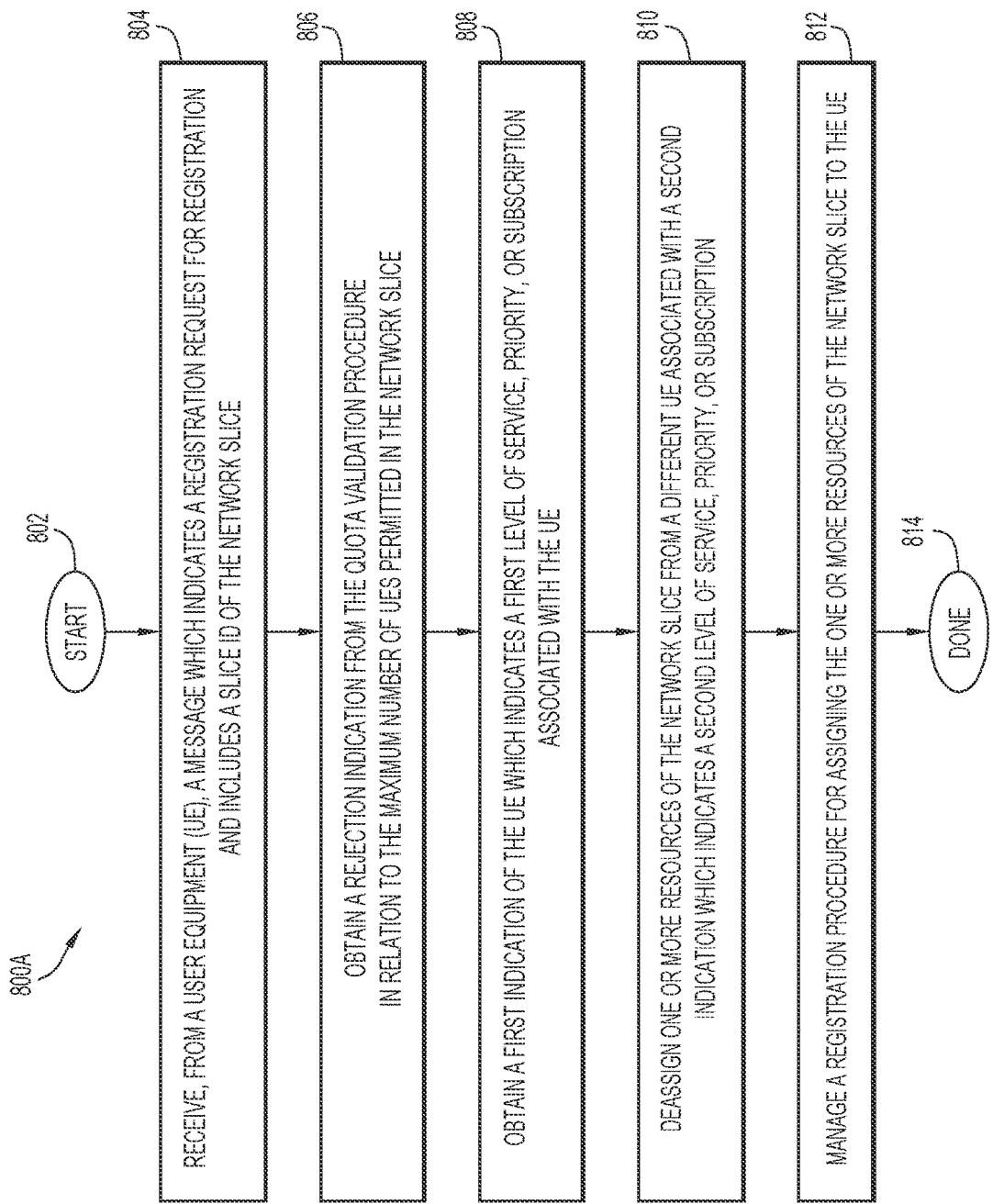
FIG. 8A is a flowchart for describing a method for improved slice resource management for use with slice quota validation according to some implementations, for prioritizing network slice registration of a UE associated with a first level of service over the different UE which is associated with a second level of service, which may correspond to the combined call flows of FIG. 7A and FIGS. 7B-1 and 7B-2.
Figure 8B:
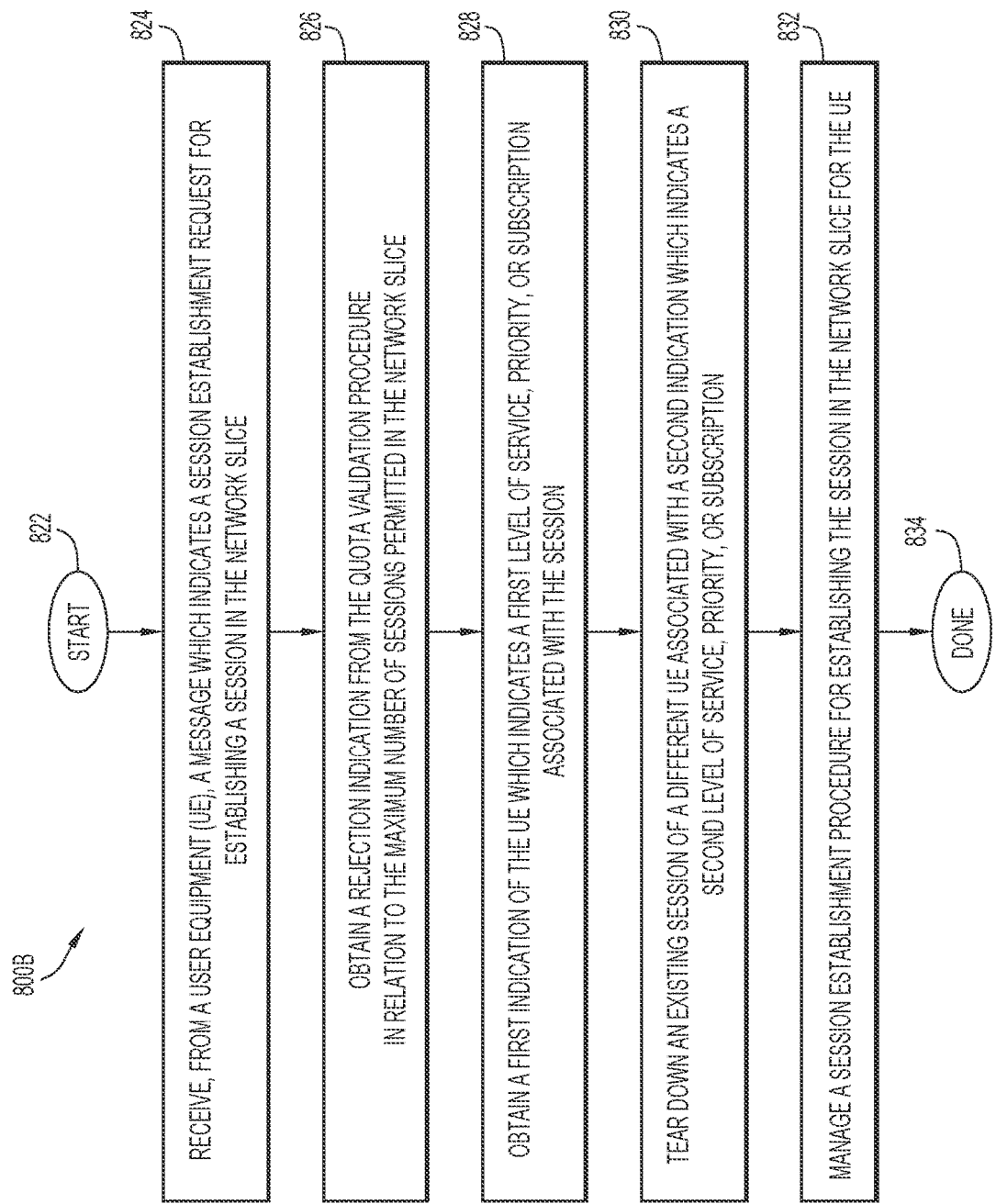
FIG. 8B is a flowchart for describing a method for improved slice resource management for use with slice quota validation according to some implementations, for prioritizing a session of a UE associated with a first level of service over a different session of the different UE associated with a second level of service, which may correspond to the combined call flows of FIGS. 7A and 7C.

In the methods to be described now in relation to FIGS. 7A and 7C, as well as FIG. 8B, priority-based session management of sessions amongst UEs are described. In the method of FIGS. 7A and 7C, the mobile network may operate to perform a quota validation procedure in relation to a maximum number of sessions (e.g. PDU sessions) permitted in the network slice (on a per-slice ID basis). The steps of call flow diagram 700 in FIG. 7C to be now described will follow the steps of FIG. 7A, which have already been described above.

FIG. 7C is an alternative second part of call flow diagram 700 of the call flow that begins with the first part in FIG. 7A, for improved slice resource management for use with slice quota validation according to some implementations. The steps in call flow diagram 700 of FIG. 7C may follow the steps in call flow diagram 700 of FIG. 7A, where different UE 103 is registered in the network slice with a session (e.g. a PDU session) that is established via the network slice.

In the call flow of the combined FIGS. 7A and 7C, quota management function 180 may include quota validation function 182 which is operative to perform a quota validation procedure in relation to a maximum number of PDU sessions permitted in the network slice. Quota management function 180 may also include quota update function 184 which is operative to perform a quota update procedure in relation to a counter of the number of PDU sessions permitted in the network slice. In some of these implementations, the network operates to prioritize a session of UE 102 associated with a first level of service, priority, or subscription over a different session of different UE 103 associated with a second level of service, priority, or subscription. In other implementations, the network operates to prioritize between different PDU sessions of the UEs based on priorities of the different DNNs that are associated with the PDU sessions.

To begin in FIG. 7C, UE 102 may send to AMF 112 a message which indicates a session establishment request for establishing a session in a network slice (step 760 of FIG. 7C). The session (e.g. a PDU session) may be for communicating data traffic of an application of UE 102. The message which indicates the session establishment request may include a requested S-NSSAI associated with the network slice in which to utilize. AMF 112 may cause a quota validation procedure to be performed with use of quota management function 180. Here, AMF 112 may call or query the quota validation function 182 to perform the quota validation procedure for a given S-NSSAI (step 762 of FIG. 7C). In the quota validation procedure, quota validation function 182 may determine that session establishment should be rejected for the network slice (e.g. the maximum number of PDU sessions has been reached) (e.g. "@ MAX") (step 764 of FIG. 7C), and return operation to AMF 112 (step 766 of FIG. 7C). In step 766, AMF 112 may obtain a "reject" indication from the quota validation procedure.

AMF 112 may obtain an indication of UE 102 and may check it to determine a level of service, priority, or subscription associated with UE 102 (step 768 of FIG. 7C). In some implementations, the indication is a priority indication associated with the DNN of the PDU session of UE 102. Here, the first indication indicates a first priority associated with the DNN of its PDU session of UE 102, which is a better or higher priority than the second priority associated with the DNN of the PDU session of different UE 103. Again, the network may be configured to prioritize between different PDU sessions of the UEs based on priorities associated with different DNNs associated with the PDU sessions.

Normally, the network would reject the session establishment request of UE 102 based on the reject indication from the quota validation procedure. Based on the differences in priorities, however, AMF 112 may manage or coordinate a tearing down of the session of the network slice from different UE 103 in a session deestablishment procedure (step 770 of FIG. 7C). AMF 112 will also cause a quota update procedure to be performed with use of quota management function 180. Here, AMF 112 may call or query the quota update function 184 to perform the quota update procedure for a given S-NSSAI (step 772 of FIG. 7C). In the quota update procedure, quota update function 184 may decrease the counter associated with the S-NSSAI (step 774 of FIG. 7C), and return operation to AMF 112 (step 776 of FIG. 7C).

Then, AMF 112 may then establish a session for UE 102 in a session establishment procedure (step 778 of FIG. 7C). As UE 102 now has a session established in the network slice, AMF 112 will also cause a quota update procedure to be performed with use of quota management function 180. Here, AMF 112 may call or query the quota update function 184 to perform the quota update procedure for a given S-NSSAI (step 780 of FIG. 7C). In the quota update procedure, quota update function 184 may increase the counter associated with the S-NSSAI (step 782 of FIG. 7C), and return operation to AMF 112 (step 784 of FIG. 7C). Thus, the session in the network slice for UE 102 is established (step 786 of FIG. 7C).

In some implementations of FIGS. 7A and 7C, AMF 112 may manage or coordinate the (automatic) reestablishment of the session in the network slice for different UE 103 associated with the second level of service, priority, or subscription, based on subsequently identifying the count of the quota validation procedure to be less than the maximum number of sessions permitted in the network slice.

FIG. 8A is a flowchart 800A for describing a method for improved slice resource management for use with slice quota validation according to some implementations, which may correspond to the combined call flows of FIG. 7A and FIGS. 7B-1 and 7B-2 for prioritizing network slice registration of a UE associated with a first level of service, priority, or subscription over the different UE which is associated with a second level of service, priority, or subscription. The method may be for use in a mobile network which is operative to perform a quota validation procedure in relation to a maximum number of UEs permitted in a network slice. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 802 of FIG. 8A, the control plane function may receive, from a UE, a message which indicates a registration request for registration and includes a slice ID of the network slice (step 804 of FIG. 8A). The control plane function may obtain a rejection indication from the quota validation procedure in relation to the maximum number of UEs permitted in the network slice (step 806 of FIG. 8A). The control plane function may obtain a first indication of the UE which indicates a first level of service, priority, or subscription associated with the UE (step 808 of FIG. 8A). The control plane function may deassign one or more resources of the network slice from a different UE associated with a second indication which indicates a second level of service, priority, or subscription (step 810 of FIG. 8A). The control plane function may then manage a registration procedure for assigning the one or more resources of the network slice to the UE (step 812 of FIG. 8A). The flowchart 800A may be completed at a done block 814 of FIG. 8A. In some implementations, the indications may be provided as network policies in the mobile network.

FIG. 8B is a flowchart 800B for describing a method for improved slice resource management for use with slice quota validation according to some implementations. The method of FIG. 3B may correspond to the combined call flows of FIGS. 7A and 7C for prioritizing establishment of a session of UE 102 associated with the first level of service, priority, or subscription over a different session of different UE 103 associated with the second level of service, priority, or subscription. The method may be for use in a mobile network which is operative to perform a quota validation procedure in relation to a maximum number of sessions (e.g. PDU sessions) permitted in a network slice. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 822 of FIG. 8B, the control plane function may receive, from the UE, a message which indicates a session establishment request for establishing a session in the network slice (step 824 of FIG. 8B). The control plane function may obtain a rejection indication from the quota validation procedure in relation to the maximum number of sessions permitted in the network slice (step 826 of FIG. 8B). The control plane function may obtain a first (priority) indication which indicates the first level of service, priority, or subscription associated with the session of the UE (step 828 of FIG. 8B). The control plane function may tear down a different session of another different UE associated with a second (priority) indication which indicates a second level of service, priority, or subscription (step 830 of FIG. 8B). Then, the control plane function may manage a session establishment procedure for establishing the session in the network slice for the UE (step 832 of FIG. 8B). Here, the network may operate to perform prioritization between different PDU sessions of the UEs based on the priorities assigned to the different DNNs associated with its PDU sessions. For example, a first priority indication may be associated with a first DNN of the session of the UE and the second priority indication may be associated with a second DNN of the different session for the different UE, where the sessions are prioritized accordingly. The flowchart 800B may be completed at a done block 834 of FIG. 8B.

According to even other aspects of the present disclosure, differential charging may be applied for improved slice resource management. Here, the network may enforce a differential charging mechanism on UEs depending upon how much time a UE kept a S-NSSAI registered without using it (e.g. without use of service being invoked). For example, if a UE has registered for an S-NSSAI and did not establish a PDU session for the S-NSSAI, the UE is "holding on" to the slice without using it and may deny slice access to another potential UE. Such differential charging would help the service provider to discourage S-NSSAI reservation with use of service.

FIG. 9 is a flowchart 900 for describing a method for improved slice resource management for use with slice quota validation according to some implementations, where charging data may be communicated with a charging indication which indicates use of a network slice without service being invoked (e.g. for a time period of non-use), for differential charging. The method may be for use in a mobile network which is operative to perform a quota validation procedure in relation to a maximum number of UEs permitted in a network slice. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 902 of FIG. 9, the control plane function may receive, from a UE, a message which indicates a registration request for registration and includes a slice ID of the network slice (step 904 of FIG. 9). The control plane function may manage or coordinate a registration procedure for assigning one or more resources of the network slice to the UE (step 906 of FIG. 9). The UE may refrain from sending a message which indicates a session establishment request (e.g. for a relatively long period of time), and therefore, no session is established for service in the network slice for the UE 102 (e.g. for a relatively long period of time) (step 908 of FIG. 9). The control plane function may cause charging function to be communicated to a charging function after UE registration (step 910 of FIG. 9), where the charging data may include a charging indication which indicates use of the network slice without service being invoked (e.g. for the time period of non-use). The flowchart 900 may be completed at a done block 912 of FIG. 9.

In some implementations, the charging indication may include or be associated with the time period of non-use (e.g. it may specify the time period). In some implementations, the charging indication may result in a charging for the UE that is "premium" for the time period of non-use.

With reference back to FIG. 2B, a charging indication 282 which may be associated with a time period 280 of non-use by UE 102 is communicated after UE registration after no session is established (e.g. for a relatively long period of time).

In some implementations, the network may have various watermark values for slice quota and, depending upon the slice usage, differential charging may be performed. For example, a first UE may register with a network slice and use a service or application, whereas a second UE may register with the network slice and not use the service or application. In conventional operation, the first UE and the second UE will be charged the same amount. In some implementations of the present disclosure, the second UE may be charged a higher amount (or surcharge) as compared with the first UE.

Currently, network selection does not consider slice availability. According to other techniques and mechanisms of the present disclosure, if a UE selects a public land mobile network (PLMN) for communication and is denied registration for a given S-NSSAI via the PLMN, the UE may operate to select another PLMN which is offering availability of one or more other S-NSSAIs (e.g. which are the same or equivalent S-NSSAIs). To facilitate such operation, in some implementations, the control plane function of the mobile network may send to the UE one or more other S-NSSAIs (i.e. S-NSSAI availability, e.g., the same or equivalent S-NSSAIs in other PLMNs) so that the UE may select the other PLMN based on a newly-selected S-NSSAI in the other PLMN. In some implementations, the one or more other S-NSSAIs (i.e. S-NSSAI availability) are sent along with Steering of Roaming (SOR) records. SOR is a signaling network-based technique that allows home operators to direct traffic to the roaming partners with which they have preferred agreements.

In some implementations, one or more of the various methods and techniques described herein may be combined in any suitable fashion as one skilled in the art would readily appreciate.

Thus, techniques and mechanisms for improved slice resource management for use with slice quota validation have been described. In one illustrative example, a method for use in a mobile network which operates to perform a quota validation procedure in relation to a maximum number of user equipments (UEs) permitted in a network slice is provided. The method may involve receiving, from a UE, a message which indicates a registration request for registration and includes a slice ID of the network slice; managing a registration procedure for assigning one or more resources of the network slice to the UE; and alternatively managing the registration procedure to refrain from assigning the one or more resources of the network slice to the UE, at least for a delay time period, based on identifying that an indication of the UE indicates an expected delay in use of service in the network slice by the UE. In some implementations, the method may be performed by a control plane function, such as a control plane function for mobility management (e.g. an AMF).

In some implementations, in managing the registration procedure for assigning the one or more resources of the network slice to the UE, the method further involves causing a quota update procedure to be performed for increasing a count of a number of UEs in the network slice. In some implementations, in alternatively managing the registration procedure to refrain from assigning the one or more resources of the network slice to the UE, the method further involves refraining from the increasing of the count of the number of UEs in the network slice in the quota update procedure.

In some implementations, the indication is included in one of: the message which indicates the request for registration; subscription data associated with a subscription of the UE; or usage data of historical network usage by the UE or by UEs having the same device or application type. In some implementations, the indication is included in the message and indicates the delay time period of the expected delay in use of service in the network slice by the UE.

In some implementations, in alternatively managing the registration procedure, the method further involves causing a timer to be set for delaying for the delay time period of the expected delay; and upon expiration of the time period, assigning the one or more resources of the network slice to the UE.

In some implementations, the method further involves causing a timer to be set for delaying for the delay time period of the expected delay; and upon expiration of the delay time period, assigning the one or more resources of the network slice to a different UE associated with a first indication which indicates a first level of service, priority, or subscription rather than the UE which is associated with a second indication which indicates a second level of service, priority, or subscription.

In some implementations, after alternatively managing the registration procedure to refrain from assigning the one or more resources of the network slice to the UE, at least for the delay time period, the method may further involve receiving, from the UE within the delay time period, a message which indicates a request for establishing a session in the network slice; and in response to the request for establishing the session in the network slice: assigning the one or more resources of the network slice to the UE; and managing a session establishment procedure for establishing the session for the UE with use of the one or more resources of the network slice.

In some implementations, managing the registration procedure for assigning the one or more resources of the network slice to the UE is based on failing to identify the indication of the UE which indicates the expected delay in use of service in the network slice by the UE.

In some implementations, in the registration procedure for assigning the one or more resources of the network slice to the UE, the method may further involve sending, to the UE, a message which indicates a registration accept and includes a delay time period; causing a timer to be set for delaying for the delay time period; and upon expiration of the delay time period, deassigning the one or more resources of the network slice from the UE.

In some implementations, in alternatively managing of the registration procedure to refrain from assigning the one or more resources of the network slice to the UE, the method may further involve sending, to the UE, a message which indicates a registration accept and includes a delay time period; causing a timer to be set for delaying for the delay time period of the expected delay; and upon expiration of the delay time period, assigning the one or more resources of the network slice to the UE.

In some implementations, in managing the registration procedure for assigning the one or more resources of the network slice to the UE, the method may involve causing charging data to be communicated to a charging function after UE registration, the charging data including a charging indication for charging according to use of the network slice without service being invoked.

As another illustrative example, an additional method for use in a mobile network which operates to perform a quota validation procedure in relation to a maximum number of UEs permitted in a network slice is provided. This method may involve receiving, from a UE, a message which indicates a registration request for registration and includes a slice ID of the network slice; obtaining a rejection indication from the quota validation procedure in relation to the maximum number of UEs permitted in the network slice; obtaining a first indication of the UE which indicates a first level of service, priority, or subscription associated with the UE; deassigning one or more resources of the network slice from a different UE associated with a second indication which indicates a second level of service, priority, or subscription; and managing a registration procedure for assigning the one or more resources of the network slice to the UE. In some implementations, the method may be performed by a control plane function, such as a control plane function for mobility management (e.g. an AMF).

In some implementations, the first level of service, priority, or subscription associated with the UE is a better or higher level of service, priority, or subscription than the second level of service, priority, or subscription associated with the different UE. In some implementations, the method may further involve obtaining subscription data associated with the UE, the subscription data including the first indication which indicates the first level of service, priority, or subscription associated with the UE.

In some implementations, the method may further involve reassigning the one or more resources of the network slice to the different UE associated with the second level of service, priority, or subscription, based on subsequently identifying a count of the quota validation procedure to be less than the maximum number of UEs permitted in the network slice.

In some implementations, the mobile network further operates to perform the quota validation procedure in relation to a maximum number of sessions permitted in the network slice, and the additional method further involves receiving, from the UE, a message which indicates a session establishment request for establishing a session in the network slice; obtaining a rejection indication from the quota validation procedure in relation to the maximum number of sessions permitted in the network slice; obtaining a first priority indication of the UE which indicates a first level of service, priority, or subscription associated with the session; tearing down a different session of another different UE associated with a second priority indication which indicates a second level of service, priority, or subscription of the different session; and managing a session establishment procedure for establishing the session in the network slice for the UE. In some implementations, the first priority indication is associated with a first DNN of the session of the UE and the second priority indication is associated with a second DNN of the different session for the another different UE.

A computer program product may include a non-transitory computer readable medium and instructions in the non-transitory computer readable medium, where the instructions are executable by one or more processors for performing the methods described herein. A computing device, such as a network node or a user device, may include one or more processors, one or more interfaces to connect in a network, and one or more memory elements for storing instructions executable on the one or more processors for performing the methods described herein.

FIG. 10 illustrates a hardware block diagram of a computing device 1000 that may perform functions associated with operations discussed herein in connection with the techniques described in relation to the above figures. In various embodiments, a computing device, such as computing device 1000 or any combination of computing devices 1000, may be configured as any entity/entities as discussed for the techniques depicted in connection with the figures in order to perform operations of the various techniques discussed herein. In particular, computing device 1000 may perform operations of a control plane function (e.g. a control plane function for mobility management, an AMF, etc.) for operation in accordance with any one of the method(s) of FIG. 3A; FIGS. 3B-1, 3B-2, and 3B-3; FIG. 4; FIGS. 5A and 5B; FIG. 6; FIGS. 7A, 7B-1, 7B-2, and 7C; FIGS. 8A and 8B; and FIG. 9.

In at least one embodiment, computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for use in a mobile network which operates to perform a quota validation procedure in relation to a maximum number of user equipments (UEs) permitted in a network slice, the method comprising:
   obtaining, from a UE, a message which indicates a registration request for registration and includes a slice ID of the network slice;
   determining whether the message obtained from the UE includes an indication of an expected delay for establishing a session for the UE for use of the network slice;
   based on determining that the message does not include the indication of the expected delay for establishing a session for the UE for use of the network slice, managing a registration procedure for assigning one or more resources of the network slice to the UE; and
   alternatively, based on determining that the message does include the indication of the expected delay in establishing a session for the UE for use of the network slice, managing the registration procedure to refrain from assigning the one or more resources of the network slice to the UE, at least for a delay time period that is identified in the message obtained from the UE.

2. The method of claim 1, further comprising:
in managing the registration procedure for assigning the one or more resources of the network slice to the UE, causing a quota update procedure to be performed for increasing a count of a number of UEs in the network slice; and
in alternatively managing the registration procedure to refrain from assigning the one or more resources of the network slice to the UE, refraining from increasing of the count of the number of UEs in the network slice in the quota update procedure.

3. The method of claim 1, wherein in alternatively managing the registration procedure, the method further comprises:
causing a timer to be set for delaying for the delay time period of the expected delay; and
upon expiration of the delay time period, assigning the one or more resources of the network slice to the UE.

4. The method of claim 1, further comprising:
causing a timer to be set for delaying for the delay time period of the expected delay; and
upon expiration of the delay time period, assigning the one or more resources of the network slice to a different UE associated with a first indication which indicates a first level of service, priority, or subscription rather than the UE which is associated with a second indication which indicates a second level of service, priority, or subscription.

5. The method of claim 1, wherein after alternatively managing the registration procedure to refrain from assigning the one or more resources of the network slice to the UE, at least for the delay time period, the method further comprises:
receiving, from the UE within the delay time period, a message which indicates a request for establishing a session in the network slice; and
in response to the request for establishing the session in the network slice:
assigning the one or more resources of the network slice to the UE; and
managing a session establishment procedure for establishing the session for the UE with use of the one or more resources of the network slice.

6. The method of claim 1, wherein in managing the registration procedure for assigning the one or more resources of the network slice to the UE, the method further comprises:
sending, to the UE, a message which indicates a registration accept and includes a predetermined delay time period;
causing a timer to be set for delaying for the predetermined delay time period; and
upon expiration of the predetermined delay time period, deassigning the one or more resources of the network slice from the UE.

7. The method of claim 1, wherein in alternatively managing of the registration procedure to refrain from assigning the one or more resources of the network slice to the UE, the method further comprises:
sending, to the UE, a message which indicates a registration accept and includes a predetermined delay time period;
causing a timer to be set for delaying for the predetermined delay time period; and
upon expiration of the predetermined delay time period, assigning the one or more resources of the network slice to the UE.

8. The method of claim 1, wherein in managing the registration procedure for assigning the one or more resources of the network slice to the UE, the method further comprises:
causing charging data to be communicated to a charging function after UE registration, the charging data including a charging indication for charging according to use of the network slice without service being invoked.

9. A computer program product comprising:
a non-transitory computer readable medium;
instructions in the non-transitory computer readable medium; and
the instructions being executable by one or more processors of a control plane function for mobility management for use in a mobile network which operates to perform quota validation in relation to a maximum number of user equipments (UEs) permitted in a network slice, and including for:
obtaining, from a UE, a message which indicates a registration request for registration and includes a slice ID of the network slice;
determining whether the message obtained from the UE includes an indication of an expected delay for establishing a session for the UE for use of the network slice;
based on determining that the message does not include the indication of the expected delay for establishing a session for the UE for use of the network slice, managing a registration procedure for assigning one or more resources of the network slice to the UE; and
alternatively, based on determining that the message does include the indication of the expected delay in establishing a session for the UE for use of the network slice, managing the registration procedure to refrain from assigning the one or more resources of the network slice to the UE, at least for a delay time period that is identified in the message obtained from the UE.

10. The computer program product of claim 9, wherein the instructions are executable by the one or more processors of the control plane function for mobility management for alternatively managing the registration procedure further by:
causing a timer to be set for delaying for the delay time period of the expected delay; and
upon expiration of the delay time period, assigning the one or more resources of the network slice to the UE.

11. The computer program product of claim 9, the instructions being executable by the one or more processors of the control plane function further for:
in managing the registration procedure for assigning the one or more resources of the network slice to the UE, causing a quota update procedure to be performed for increasing a count of a number of UEs in the network slice; and
in alternatively managing the registration procedure to refrain from assigning the one or more resources of the network slice to the UE, refraining from increasing of the count of the number of UEs in the network slice in the quota update procedure.

12. The computer program product of claim 9, wherein after alternatively managing the registration procedure to refrain from assigning the one or more resources of the network slice to the UE, at least for the delay time period, the instructions being executable by the one or more processors of the control plane function further for:

receiving, from the UE within the delay time period, a message which indicates a request for establishing a session in the network slice; and in response to the request for establishing the session in the network slice:

assigning the one or more resources of the network slice to the UE; and managing a session establishment procedure for establishing the session for the UE with use of the one or more resources of the network slice.

13. The computer program product of claim 9, wherein in managing the registration procedure for assigning the one or more resources of the network slice to the UE, the instructions being executable by the one or more processors of the control plane function further for:

sending, to the UE, a message which indicates a registration accept and includes a predetermined delay time period;

causing a timer to be set for delaying for the predetermined delay time period; and upon expiration of the predetermined delay time period, deassigning the one or more resources of the network slice from the UE.

14. The computer program product of claim 9, wherein in managing the registration procedure for assigning the one or more resources of the network slice to the UE, the instructions being executable by the one or more processors of the control plane function further for:

causing charging data to be communicated to a charging function after UE registration, the charging data including a charging indication for charging according to use of the network slice without service being invoked.

\* \* \* \* \*